US012346869B2

(12) United States Patent
Garden

(10) Patent No.: US 12,346,869 B2
(45) Date of Patent: Jul. 1, 2025

(54) SYSTEMS AND METHODS FOR PREPARING FOOD PRODUCTS

(71) Applicant: Congruens Group, LLC, San Carlos, CA (US)

(72) Inventor: Alexander John Garden, San Carlos, CA (US)

(73) Assignee: Congruens Group, LLC, San Carlos, CA (US)

( * ) Notice: Subject to any disclaimer, the term of this patent is extended or adjusted under 35 U.S.C. 154(b) by 0 days.

(21) Appl. No.: 18/450,510

(22) Filed: Aug. 16, 2023

(65) Prior Publication Data

US 2024/0046195 A1 Feb. 8, 2024

Related U.S. Application Data

(60) Continuation of application No. 16/164,740, filed on Oct. 18, 2018, now abandoned, which is a
(Continued)

(51) Int. Cl.
*G06Q 10/00* (2023.01)
*A23L 5/10* (2016.01)
(Continued)

(52) U.S. Cl.
CPC ............ *G06Q 10/0832* (2013.01); *A23L 5/15* (2016.08); *B60P 3/007* (2013.01); *B60P 3/025* (2013.01);
(Continued)

(58) Field of Classification Search
CPC ......... G06Q 10/0832; G06Q 10/08355; G06Q 50/12; A23L 5/15; B60P 3/007; B60P 3/025; G08G 1/205; A23V 2002/00
(Continued)

(56) References Cited

U.S. PATENT DOCUMENTS 377,594 A 2/1888 Baldwin
1,263,804 A 4/1918 Rice
(Continued)

FOREIGN PATENT DOCUMENTS

AU 2017248224 A1 11/2018
CA 2952769 A1 12/2014
(Continued)

OTHER PUBLICATIONS

U.S. Appl. No. 18/463,261, filed Sep. 7, 2023, Vehicle WIth Context Sensitive Information Presentation, Alexander John Garden, et al.
(Continued)

*Primary Examiner* — Rokib Masud
(74) *Attorney, Agent, or Firm* — Goodwin Procter LLP

(57) ABSTRACT

A food preparation and delivery system can include a plurality of cooking units such as ovens, each containing one or more prepared, but partially or completely uncooked, food items. The food items in the cooking units are for delivery to each of a corresponding plurality of consumer delivery destinations. The cooking units are loaded into a cargo compartment of a delivery vehicle for delivery to the plurality of consumer delivery destinations. The cooking conditions within the cooking unit are controlled such the each food item is cooked prior to arrival at the consumer destination location. In at least some embodiments, the estimated delivery time for each consumer destination location can be dynamically updated and the cooking conditions within the cooking unit adjusted.

17 Claims, 11 Drawing Sheets

Related U.S. Application Data continuation of application No. 15/040,866, filed on Feb. 10, 2016, now Pat. No. 10,140,587, which is a division of application No. 13/920,998, filed on Jun. 18, 2013, now Pat. No. 9,292,889.

(51) Int. Cl.
| | | |
|---|---|---|
| *B60P 3/00* | (2006.01) | |
| *B60P 3/025* | (2006.01) | |
| *G06Q 10/0832* | (2023.01) | |
| *G06Q 10/0835* | (2023.01) | |
| *G06Q 50/12* | (2012.01) | |
| *G08G 1/00* | (2006.01) | |

(52) U.S. Cl.
CPC ...... *B60P 3/0257* (2013.01); *G06Q 10/08355* (2013.01); *G06Q 50/12* (2013.01); *G08G 1/205* (2013.01); *A23V 2002/00* (2013.01)

(58) Field of Classification Search
USPC .......................................................... 705/15
See application file for complete search history.

(56) References Cited

U.S. PATENT DOCUMENTS

| | | | |
|---|---|---|---|
| 1,263,805 | A | 4/1918 | Rice |
| 1,331,241 | A | 2/1920 | Converse |
| 1,457,233 | A | 5/1923 | Slovack |
| 1,581,310 | A | 4/1926 | Fetschan |
| 1,613,223 | A | 1/1927 | Davis |
| 2,078,840 | A | 4/1937 | Oscar et al. |
| 2,174,334 | A | 9/1939 | Steinfels |
| 2,906,020 | A | 9/1959 | Welsh |
| 3,060,838 | A | 10/1962 | Priore |
| 3,060,920 | A | 10/1962 | Dibert |
| 3,132,423 | A | 5/1964 | De Lano |
| 3,191,590 | A | 6/1965 | Haley |
| 3,521,030 | A | 7/1970 | Maahs |
| 3,780,643 | A | 12/1973 | Papai |
| 3,982,033 | A | 9/1976 | Zito |
| 3,985,991 | A | 10/1976 | Levinson |
| 4,112,834 | A | 9/1978 | Thiry |
| 4,143,902 | A | 3/1979 | Johnstone |
| 4,250,618 | A | 2/1981 | Custer et al. |
| 4,372,185 | A | 2/1983 | Pila |
| 4,373,636 | A | 2/1983 | Hoffman |
| 4,464,105 | A | 8/1984 | Voegtlin |
| 4,556,046 | A | 12/1985 | Riffel et al. |
| 4,632,836 | A | 12/1986 | Abbott et al. |
| 4,634,365 | A | 1/1987 | Triporo et al. |
| 4,643,167 | A | 2/1987 | Brewer |
| 4,656,068 | A | 4/1987 | Raines |
| 4,716,819 | A | 1/1988 | Beltz |
| 4,718,769 | A | 1/1988 | Conkey |
| 4,753,406 | A | 6/1988 | Kodama et al. |
| 4,790,241 | A | 12/1988 | Lugo |
| 4,801,097 | A | 1/1989 | Fitch, Jr. |
| 4,816,646 | A | 3/1989 | Solomon et al. |
| 4,912,338 | A | 3/1990 | Bingham |
| 4,919,477 | A | 4/1990 | Bingham et al. |
| 4,924,763 | A | 5/1990 | Bingham |
| 5,031,602 | A | 7/1991 | Vick |
| 5,039,535 | A | 8/1991 | Lang et al. |
| D326,034 | S | 5/1992 | Kluesner |
| 5,109,760 | A | 5/1992 | Ansari |
| D326,749 | S | 6/1992 | Apps et al. |
| 5,117,749 | A | 6/1992 | Bakker |
| 5,172,328 | A | 12/1992 | Cahlander et al. |
| 5,179,843 | A | 1/1993 | Cohausz |
| 5,190,780 | A | 3/1993 | Fehr et al. |
| 5,243,899 | A | 9/1993 | Moshier et al. |
| 5,244,344 | A | 9/1993 | Doeberl et al. |
| 5,256,432 | A | 10/1993 | McDonald et al. |
| 5,285,604 | A | 2/1994 | Carlin |
| 5,299,557 | A | 4/1994 | Braithwaite et al. |
| 5,306,192 | A | 4/1994 | Caveza et al. |
| 5,423,477 | A | 6/1995 | Valdman et al. |
| 5,454,295 | A | 10/1995 | Cox et al. |
| 5,458,055 | A | 10/1995 | Fitch, Jr. |
| 5,493,294 | A | 2/1996 | Morita |
| 5,505,122 | A | 4/1996 | Gerrit |
| 5,540,943 | A | 7/1996 | Naramura |
| 5,562,183 | A | 10/1996 | Naramura |
| 5,732,610 | A | 3/1998 | Halladay et al. |
| 5,873,294 | A | 2/1999 | Sciuto |
| 5,921,163 | A | 7/1999 | McInnes et al. |
| 5,921,170 | A | 7/1999 | Khatchadourian et al. |
| 5,997,924 | A | 12/1999 | Olander, Jr. et al. |
| D426,646 | S | 6/2000 | Monaghan et al. |
| D426,754 | S | 6/2000 | Kim |
| 6,127,984 | A | 10/2000 | Klebe et al. |
| 6,189,944 | B1 | 2/2001 | Piche |
| 6,320,165 | B1 | 11/2001 | Ovadia |
| 6,396,031 | B1 | 5/2002 | Forrester |
| 6,431,628 | B1 | 8/2002 | Bell, Jr. |
| 6,465,244 | B1 | 10/2002 | Annable et al. |
| 6,513,671 | B2 | 2/2003 | Dicello et al. |
| 6,546,847 | B2 | 4/2003 | Pilati et al. |
| 6,557,260 | B1 | 5/2003 | Morris |
| 6,568,586 | B1 | 5/2003 | VanEsley et al. |
| 6,626,996 | B1 | 9/2003 | Amigh et al. |
| 6,672,601 | B1 * | 1/2004 | Hofheins ................ A47F 10/06 |
| | | | 280/47.34 |
| 6,755,122 | B2 | 6/2004 | Holmes |
| 6,843,167 | B1 | 1/2005 | Kanafani et al. |
| 6,858,243 | B2 | 2/2005 | Blanchet et al. |
| 6,957,111 | B2 | 10/2005 | Zhu et al. |
| 7,127,984 | B2 | 10/2006 | Holmes |
| 7,174,830 | B1 | 2/2007 | Dong |
| 7,263,990 | B1 | 9/2007 | Lenhart |
| 7,505,929 | B2 | 3/2009 | Angert et al. |
| D593,363 | S | 6/2009 | Collinson |
| 7,607,706 | B2 | 10/2009 | Cunningham et al. |
| 7,678,036 | B1 | 3/2010 | Malitas et al. |
| 7,778,773 | B2 | 8/2010 | Yaqub et al. |
| 7,884,306 | B2 | 2/2011 | Leach |
| 7,984,667 | B2 | 7/2011 | Freudinger |
| 8,126,938 | B2 | 2/2012 | Cohen et al. |
| 8,276,505 | B2 | 10/2012 | Buehler |
| D678,005 | S | 3/2013 | Zemel et al. |
| 8,430,262 | B2 | 4/2013 | Corbett et al. |
| 8,549,432 | B2 | 10/2013 | Warner |
| 8,561,823 | B1 | 10/2013 | Krupa |
| 8,663,419 | B2 | 3/2014 | Corbett et al. |
| 8,710,408 | B2 * | 4/2014 | Khatchadourian ...... A21D 8/02 |
| | | | 219/400 |
| 8,732,087 | B2 | 5/2014 | Cohen et al. |
| 8,807,377 | B2 | 8/2014 | Corbett et al. |
| 8,860,587 | B2 | 10/2014 | Nordstrom |
| D720,227 | S | 12/2014 | Corbett et al. |
| 8,991,635 | B2 | 3/2015 | Myerscough |
| 9,010,621 | B2 | 4/2015 | Baker et al. |
| 9,126,717 | B2 | 9/2015 | Myerscough |
| 9,126,719 | B2 | 9/2015 | Corbett et al. |
| D743,302 | S | 11/2015 | Weiner et al. |
| D743,311 | S | 11/2015 | Weiner et al. |
| 9,292,889 | B2 | 3/2016 | Garden |
| D754,250 | S | 4/2016 | Elmer |
| 9,305,280 | B1 | 4/2016 | Berg et al. |
| 9,321,387 | B2 | 4/2016 | Lamb |
| 9,387,786 | B2 | 7/2016 | Weiner et al. |
| 9,446,889 | B2 | 9/2016 | Lopes et al. |
| D774,900 | S | 12/2016 | Longoni et al. |
| 9,522,761 | B2 | 12/2016 | Baker et al. |
| 9,788,157 | B2 | 10/2017 | Shaffer et al. |
| 9,815,191 | B2 | 11/2017 | Oleynik |
| 9,840,340 | B2 | 12/2017 | O'Toole |
| 9,895,798 | B2 | 2/2018 | Helmer |
| 9,914,223 | B2 | 3/2018 | Fritz-Jung et al. |
| 9,928,540 | B1 | 3/2018 | Gerard et al. |
| 10,019,143 | B1 | 7/2018 | Haitani et al. |
| 10,049,236 | B1 | 8/2018 | Alkarmi et al. |
| 10,140,587 | B2 | 11/2018 | Garden |

(56) References Cited

U.S. PATENT DOCUMENTS

| | | |
|---|---|---|
| 10,222,798 B1 | 3/2019 | Brady et al. |
| 10,241,516 B1 | 3/2019 | Brady et al. |
| 10,303,171 B1 | 5/2019 | Brady et al. |
| 10,311,530 B2 | 6/2019 | Becker et al. |
| 10,604,055 B2 | 3/2020 | Eismann |
| D893,247 S | 8/2020 | Chiang et al. |
| 11,304,421 B2 | 4/2022 | Handwerker |
| 11,523,616 B2 | 12/2022 | Mecsaci |
| 11,816,624 B2 | 11/2023 | Goldberg |
| 12,005,566 B2 | 6/2024 | Goldberg et al. |
| 2002/0048624 A1 | 4/2002 | Blanchet et al. |
| 2002/0148831 A1 | 10/2002 | Dicello et al. |
| 2002/0153370 A1 | 10/2002 | Stutman |
| 2002/0170303 A1 | 11/2002 | Clark et al. |
| 2002/0176921 A1 | 11/2002 | Torghele et al. |
| 2003/0020914 A1 | 1/2003 | Jackson |
| 2003/0037681 A1 | 2/2003 | Zhu et al. |
| 2003/0113414 A1 | 6/2003 | Nolfi, Jr. |
| 2003/0136782 A1 | 7/2003 | Dicello et al. |
| 2003/0194476 A1 | 10/2003 | Shefet |
| 2003/0209194 A1 | 11/2003 | Amigh et al. |
| 2004/0020375 A1 | 2/2004 | Holmes |
| 2004/0026946 A1 | 2/2004 | Reed et al. |
| 2004/0156963 A1 | 8/2004 | Amoroso |
| 2004/0192351 A1 | 9/2004 | Duncan |
| 2004/0194641 A1 | 10/2004 | Holmes |
| 2004/0253348 A1 | 12/2004 | Woodward et al. |
| 2004/0255795 A1 | 12/2004 | Holmes |
| 2005/0021407 A1* | 1/2005 | Kargman ............... G07G 1/12 |
| | | 705/15 |
| 2005/0193901 A1 | 9/2005 | Buehler |
| 2005/0214415 A1 | 9/2005 | Craig et al. |
| 2005/0256774 A1 | 11/2005 | Clothier et al. |
| 2006/0010037 A1 | 1/2006 | Angert et al. |
| 2006/0027106 A1 | 2/2006 | Craig et al. |
| 2006/0049198 A1 | 3/2006 | Guard |
| 2006/0111838 A1 | 5/2006 | Hughes |
| 2006/0182603 A1 | 8/2006 | Hawes |
| 2006/0226669 A1 | 10/2006 | Tong et al. |
| 2007/0160715 A1 | 7/2007 | Elnakib et al. |
| 2007/0216179 A1 | 9/2007 | Hirooka et al. |
| 2007/0221029 A1 | 9/2007 | Freudinger |
| 2008/0000358 A1* | 1/2008 | Goeckner ............... A47J 31/56 |
| | | 99/281 |
| 2008/0023459 A1 | 1/2008 | Leach |
| 2008/0178749 A1 | 7/2008 | Stutman |
| 2008/0203746 A1 | 8/2008 | Cunningham et al. |
| 2008/0250869 A1 | 10/2008 | Breed et al. |
| 2008/0275643 A1 | 11/2008 | Yaqub et al. |
| 2009/0048890 A1 | 2/2009 | Burgh |
| 2009/0057381 A1 | 3/2009 | Gokhale |
| 2009/0146846 A1 | 6/2009 | Grossman |
| 2009/0241481 A1 | 10/2009 | Sus et al. |
| 2010/0179878 A1 | 7/2010 | Dawson et al. |
| 2010/0182136 A1 | 7/2010 | Pryor |
| 2010/0200591 A1 | 8/2010 | Myerscough |
| 2010/0300230 A1 | 12/2010 | Helmer |
| 2010/0328048 A1 | 12/2010 | Meli, Jr. et al. |
| 2011/0036846 A1 | 2/2011 | Corbett et al. |
| 2011/0209661 A1 | 9/2011 | Fritz-Jung et al. |
| 2011/0220652 A1 | 9/2011 | Corbett et al. |
| 2011/0235463 A1 | 9/2011 | Justusson et al. |
| 2011/0258011 A1 | 10/2011 | Burns et al. |
| 2012/0019110 A1 | 1/2012 | Ono et al. |
| 2012/0024859 A1 | 2/2012 | Longoni et al. |
| 2012/0024897 A1 | 2/2012 | Corbett et al. |
| 2012/0068946 A1 | 3/2012 | Tang et al. |
| 2012/0175367 A1 | 7/2012 | Lopes et al. |
| 2013/0101709 A1 | 4/2013 | Rader |
| 2013/0232029 A1 | 9/2013 | Rovik et al. |
| 2013/0253833 A1 | 9/2013 | Tuukkanen |
| 2013/0331989 A1 | 12/2013 | Umeno et al. |
| 2014/0069413 A1 | 3/2014 | Galatte et al. |
| 2014/0089077 A1 | 3/2014 | Zuckerman et al. |
| 2014/0095311 A1 | 4/2014 | Bulloch, Jr. |
| 2014/0196411 A1 | 7/2014 | Procyshyn et al. |
| 2014/0209634 A1 | 7/2014 | Metropulos et al. |
| 2014/0239020 A1 | 8/2014 | Lamb |
| 2014/0249913 A1 | 9/2014 | Endo |
| 2014/0330738 A1* | 11/2014 | Falcone ............ G06Q 10/08355 |
| | | 705/338 |
| 2014/0330739 A1 | 11/2014 | Falcone et al. |
| 2014/0338237 A1 | 11/2014 | Chu et al. |
| 2014/0370167 A1 | 12/2014 | Garden |
| 2015/0006005 A1 | 1/2015 | Yu et al. |
| 2015/0019354 A1 | 1/2015 | Chan et al. |
| 2015/0025975 A1 | 1/2015 | Wallach |
| 2015/0068945 A1 | 3/2015 | Baker et al. |
| 2015/0068946 A1 | 3/2015 | Baker et al. |
| 2015/0088779 A1 | 3/2015 | Falcone et al. |
| 2015/0120504 A1 | 4/2015 | Todasco |
| 2015/0142594 A1 | 5/2015 | Lutnick et al. |
| 2015/0161446 A1 | 6/2015 | Kirkpatrick |
| 2015/0161667 A1 | 6/2015 | Stevens et al. |
| 2015/0170099 A1 | 6/2015 | Beach-Drummond |
| 2015/0256534 A1 | 9/2015 | Goudy et al. |
| 2015/0262121 A1* | 9/2015 | Riel-Dalpe ............ G06Q 50/12 |
| | | 705/15 |
| 2015/0290795 A1 | 10/2015 | Oleynik |
| 2015/0343933 A1 | 12/2015 | Weiner et al. |
| 2015/0343936 A1 | 12/2015 | Weiner et al. |
| 2016/0053514 A1 | 2/2016 | Savage et al. |
| 2016/0054163 A1 | 2/2016 | Walton et al. |
| 2016/0058065 A1 | 3/2016 | Mantry et al. |
| 2016/0063435 A1 | 3/2016 | Shah et al. |
| 2016/0066732 A1 | 3/2016 | Sarvestani |
| 2016/0073644 A1 | 3/2016 | Dickey |
| 2016/0104339 A1 | 4/2016 | Saccone, Jr. |
| 2016/0162833 A1 | 6/2016 | Garden |
| 2016/0200438 A1 | 7/2016 | Bokeno et al. |
| 2016/0251101 A1 | 9/2016 | Kong et al. |
| 2016/0260161 A1 | 9/2016 | Atchley et al. |
| 2016/0264033 A1 | 9/2016 | Tollefson et al. |
| 2016/0275470 A1 | 9/2016 | Straw et al. |
| 2016/0292798 A1 | 10/2016 | Berry et al. |
| 2016/0350837 A1 | 12/2016 | Williams et al. |
| 2016/0353235 A1 | 12/2016 | Williams et al. |
| 2016/0364679 A1 | 12/2016 | Cao |
| 2016/0371983 A1 | 12/2016 | Ronning et al. |
| 2017/0010608 A1 | 1/2017 | High et al. |
| 2017/0011319 A1 | 1/2017 | Elliot et al. |
| 2017/0024789 A1 | 1/2017 | Frehn et al. |
| 2017/0024806 A1 | 1/2017 | High et al. |
| 2017/0038121 A1 | 2/2017 | Lu et al. |
| 2017/0055535 A1 | 3/2017 | Froelicher et al. |
| 2017/0055752 A1 | 3/2017 | Mueller et al. |
| 2017/0115009 A1 | 4/2017 | Ramphos et al. |
| 2017/0124670 A1 | 5/2017 | Becker et al. |
| 2017/0146361 A1 | 5/2017 | Lucas et al. |
| 2017/0148075 A1 | 5/2017 | High et al. |
| 2017/0178066 A1 | 6/2017 | High et al. |
| 2017/0178072 A1 | 6/2017 | Poornachandran et al. |
| 2017/0216179 A1 | 8/2017 | Bize et al. |
| 2017/0223772 A1 | 8/2017 | Shingler |
| 2017/0265687 A1 | 9/2017 | Veltrop et al. |
| 2017/0275077 A1 | 9/2017 | Chiang et al. |
| 2017/0282374 A1 | 10/2017 | Matula et al. |
| 2017/0290345 A1 | 10/2017 | Garden et al. |
| 2017/0318821 A1 | 11/2017 | Gallon et al. |
| 2017/0337511 A1 | 11/2017 | Shroff et al. |
| 2017/0345033 A1 | 11/2017 | Wilkinson et al. |
| 2017/0348854 A1 | 12/2017 | Oleynik |
| 2018/0025445 A1 | 1/2018 | Becker et al. |
| 2018/0032997 A1 | 2/2018 | Gordon et al. |
| 2018/0053369 A1 | 2/2018 | High et al. |
| 2018/0056751 A1 | 3/2018 | Kiarostami et al. |
| 2018/0060943 A1 | 3/2018 | Mattingly et al. |
| 2018/0070776 A1 | 3/2018 | Ganninger |
| 2018/0071939 A1 | 3/2018 | Garden et al. |
| 2018/0105344 A1 | 4/2018 | Chiang et al. |
| 2018/0121037 A1 | 5/2018 | Wajda et al. |
| 2018/0127192 A1 | 5/2018 | Cohen |
| 2018/0141682 A1 | 5/2018 | Blake et al. |
| 2018/0158153 A1 | 6/2018 | Ekin |

(56) References Cited

U.S. PATENT DOCUMENTS

| | | |
|---|---|---|
| 2018/0194257 A1 | 7/2018 | Eismann |
| 2018/0253805 A1 | 9/2018 | Kelly et al. |
| 2018/0321679 A1 | 11/2018 | Nixon |
| 2018/0322413 A1 | 11/2018 | Yocam et al. |
| 2018/0328591 A1 | 11/2018 | Eggers |
| 2018/0338504 A1 | 11/2018 | Lavri et al. |
| 2019/0012625 A1 | 1/2019 | Lawrenson et al. |
| 2019/0034967 A1 | 1/2019 | Ferguson et al. |
| 2019/0037855 A1 | 2/2019 | Hamon et al. |
| 2019/0047457 A1 | 2/2019 | Eismann |
| 2019/0047460 A1 | 2/2019 | Goldberg et al. |
| 2019/0049988 A1 | 2/2019 | Meij |
| 2019/0050797 A1 | 2/2019 | Goldberg et al. |
| 2019/0050798 A1 | 2/2019 | Goldberg et al. |
| 2019/0050799 A1 | 2/2019 | Goldberg et al. |
| 2019/0050800 A1 | 2/2019 | Garden |
| 2019/0050801 A1 | 2/2019 | Garden |
| 2019/0050802 A1 | 2/2019 | Garden |
| 2019/0050803 A1 | 2/2019 | Garden |
| 2019/0050804 A1 | 2/2019 | Garden |
| 2019/0050951 A1 | 2/2019 | Goldberg et al. |
| 2019/0050952 A1 | 2/2019 | Goldberg et al. |
| 2019/0051083 A1 | 2/2019 | Goldberg et al. |
| 2019/0051086 A1 | 2/2019 | Goldberg et al. |
| 2019/0051087 A1 | 2/2019 | Goldberg et al. |
| 2019/0051090 A1 | 2/2019 | Goldberg et al. |
| 2019/0056751 A1 | 2/2019 | Ferguson et al. |
| 2019/0090679 A1 | 3/2019 | Peng |
| 2019/0111955 A1 | 4/2019 | Canoso et al. |
| 2019/0188640 A1 | 6/2019 | Yamaguchi et al. |
| 2019/0196498 A1 | 6/2019 | Matsuoka et al. |
| 2019/0236961 A1 | 8/2019 | Kaneko et al. |
| 2019/0270398 A1 | 9/2019 | Goldberg et al. |
| 2019/0279181 A1 | 9/2019 | Kelly et al. |
| 2019/0285283 A1 | 9/2019 | Ebrom et al. |
| 2019/0370915 A1 | 12/2019 | Garden et al. |
| 2020/0070717 A1 | 3/2020 | Garden et al. |
| 2020/0090226 A1 | 3/2020 | Garden et al. |
| 2020/0143295 A1 | 5/2020 | Sakurada |
| 2020/0143688 A1 | 5/2020 | Shah et al. |
| 2020/0154949 A1 | 5/2020 | Klein et al. |
| 2020/0159188 A1 | 5/2020 | He |
| 2020/0160463 A1 | 5/2020 | He |
| 2020/0167722 A1 | 5/2020 | Goldberg |
| 2020/0175467 A1 | 6/2020 | Goldberg et al. |
| 2020/0238534 A1 | 7/2020 | Goldberg et al. |
| 2020/0334628 A1 | 10/2020 | Goldberg et al. |
| 2020/0397194 A1 | 12/2020 | Goldberg et al. |
| 2021/0097905 A1 | 4/2021 | Garden et al. |
| 2021/0213618 A1 | 7/2021 | Goldberg et al. |
| 2021/0298312 A1 | 9/2021 | Handwerker |
| 2022/0079169 A1 | 3/2022 | Mecsaci |

FOREIGN PATENT DOCUMENTS

| | | |
|---|---|---|
| CN | 100588328 C | 2/2010 |
| CN | 202262349 U | 6/2012 |
| CN | 102750658 A | 10/2012 |
| CN | 103037697 A | 4/2013 |
| CN | 104519746 A | 4/2015 |
| CN | 105556562 A | 5/2016 |
| CN | 108125571 A | 6/2018 |
| CN | 109475129 A | 3/2019 |
| DE | 29606255 U1 | 8/1996 |
| EP | 550018 A1 | 7/1993 |
| EP | 563413 A1 | 10/1993 |
| EP | 2230184 A1 | 9/2010 |
| EP | 1685045 B2 | 12/2014 |
| EP | 2984618 B1 | 9/2018 |
| EP | 2858507 B1 | 2/2019 |
| FR | 2485340 A1 | 12/1981 |
| FR | 3027148 B1 | 12/2016 |
| FR | 3047146 A1 | 8/2017 |
| FR | 3047149 A1 | 8/2017 |
| FR | 3047150 A1 | 8/2017 |
| FR | 3047158 A1 | 8/2017 |
| GB | 2395893 A | 6/2004 |
| JP | H09267276 A | 10/1997 |
| JP | 2001505064 A | 4/2001 |
| JP | 2002010731 A | 1/2002 |
| JP | 2002-80110 A | 3/2002 |
| JP | 2002347944 A | 12/2002 |
| JP | 2003102447 A | 4/2003 |
| JP | 2003240405 A | 8/2003 |
| JP | 2005225576 A | 8/2005 |
| JP | 2009034760 A | 2/2009 |
| JP | 4741267 B2 | 8/2011 |
| JP | 5244344 B2 | 7/2013 |
| JP | 2013252601 A | 12/2013 |
| JP | 2015526063 A | 9/2015 |
| KR | 200360448 Y1 | 8/2004 |
| KR | 10-2009-0098949 A | 9/2009 |
| KR | 20110062522 A | 6/2011 |
| KR | 20150065076 A | 6/2015 |
| KR | 10-2015-0121771 A | 10/2015 |
| KR | 101759091 B1 | 7/2017 |
| KR | 20190029249 A | 3/2019 |
| TW | 201303784 A | 1/2013 |
| TW | 201351313 A | 12/2013 |
| TW | 201740340 A | 11/2017 |
| TW | 201811517 A | 4/2018 |
| WO | 9208358 A1 | 5/1992 |
| WO | 2001067869 A1 | 9/2001 |
| WO | 2012005683 A1 | 1/2012 |
| WO | 2013162702 A1 | 10/2013 |
| WO | 2013184910 A1 | 12/2013 |
| WO | 2014026273 A1 | 2/2014 |
| WO | 2014205041 A1 | 12/2014 |
| WO | 2014205549 A1 | 12/2014 |
| WO | 2015006649 A1 | 1/2015 |
| WO | 2015125017 A3 | 6/2016 |
| WO | 2016094765 A1 | 6/2016 |
| WO | 2016169654 A1 | 10/2016 |
| WO | 2017019501 A1 | 2/2017 |
| WO | 2017134147 A1 | 8/2017 |
| WO | 2017134149 A1 | 8/2017 |
| WO | 2017134150 A1 | 8/2017 |
| WO | 2017134153 A1 | 8/2017 |
| WO | 2017134156 A1 | 8/2017 |
| WO | 2017134417 A2 | 8/2017 |
| WO | 2017165415 A1 | 9/2017 |
| WO | 2017177041 A2 | 10/2017 |
| WO | 2017205758 A1 | 11/2017 |
| WO | 2018039549 A1 | 3/2018 |
| WO | 2018052583 A1 | 3/2018 |
| WO | 2018052842 A1 | 3/2018 |
| WO | 2018165105 A1 | 9/2018 |
| WO | 2018236668 A1 | 12/2018 |
| WO | 2019014020 A1 | 1/2019 |
| WO | 2019014023 A1 | 1/2019 |
| WO | 2019014027 A1 | 1/2019 |
| WO | 2019014030 A1 | 1/2019 |
| WO | 2019050615 A1 | 3/2019 |
| WO | 2019070733 A1 | 4/2019 |
| WO | 2019079345 A1 | 4/2019 |
| WO | 2019232505 A1 | 12/2019 |
| WO | 2019232506 A1 | 12/2019 |

OTHER PUBLICATIONS

U.S. Appl. No. 18/665,310, filed May 15, 2024, On-Demand Robotic Food Assembly Equipment, and Related Systems and Methods, Joshua Gouled Goldberg, et al.
U.S. Appl. No. 15/734,127, filed Dec. 1, 2021, En Route Food Product Preparation, Joshua Gouled Goldberg, et al.
U.S. Appl. No. 18/627,122, filed Apr. 4, 2024, Delivery Vehicles For En Route Food Product Preparation, Joshua Gouled Goldberg, et al.
U.S. Appl. No. 18/484,276, filed Oct. 10, 2023, Delivery of Food Items by Aerial or Ground Drones to and From Delivery Vehicles, Joshua Gouled Goldberg, et al.
American Planning Association, Regulating Food Trucks, 2015 (Year: 2015).

(56) References Cited

OTHER PUBLICATIONS

CPG Insights, "Mobile factories and robotic pizza chefs : Rev your engines," email newsletter, dated May 10, 2018, 13 pages.
EKIM, "Robots at the Service of taste : EKIM launches the restoration of the future with the first robot cook!" downloaded from https://ekim.fr/ on Jun. 29, 2018, 11 pages.
International Search Report and Written Opinion for International Application No. PCT/US19/35100 mailed Oct. 8, 2019 (24 pages).
International Search Report and Written Opinion for International Application No. PCT/US2014/042879, mailed Oct. 22, 2014, 11 pages.
International Search Report and Written Opinion for International Application No. PCT/US2018/037537 mailed on Oct. 1, 2018, 43 Pages.
International Search Report and Written Opinion for International Application No. PCT/US2018/040738 mailed on Feb. 22, 2019, pp. 25.
International Search Report and Written Opinion for PCT/US2018/040714 dated Nov. 16, 2018 in 8 pages.
International Search Report and Written Opinion for PCT/US2018/040730 dated Nov. 14, 2018 in 20 pages.
International Search Report and Written Opinion for PCT/US2018/040765 dated Nov. 16, 2018 in 13 pages.
International Search Report and Written Opinion for PCT/US2018/040785 dated Nov. 19, 2018 in 22 pages.
International Search Report and Written Opinion for PCT/US2018/056144 dated Feb. 12, 2019 in 28 pages.
International Search Report and Written Opinion for PCT/US2019/012755 dated May 8, 2019 in 18 pages.
International Search Report and Written Opinion in Application PCT/US2018/053997, dated Feb. 1, 2019, 15 pages.
International Search Report and Written Opinion in International Application PCT/US2019/035101, mailed Oct. 17, 2019, 12 pages.
International Search Report and Written Opinion in International Application PCT/US2019/064864, mailed Jun. 25, 2020, 18 pages.
International Search Report and Written Opinion of the International Searching Authority, dated Jan. 31, 2018, for International Application No. PCT/US2017/050950, 20 pages.
International Search Report and Written Opinion of the International Searching Authority, dated Nov. 27, 2017, for International Application No. PCT/US2017/026408, 36 pages.
Joussellin, "Pizza: the pizza-machine robots go to the stove," published online Jun. 3, 2018, downloaded from http://www.rtl.fr/actu/futur/pizza-les-robots-pizzaiolos-se-mettent-au-fourneau-7793604225 on Jun. 7, 2018, 8 pages (with machine generated English translation).
Lamb, "Scoop: Little Caesars Has a Patent for a Pizza-Making Robot," Mar. 13, 2018, downloaded from https://thespoon.tech/scoop-little-caesars-has-a-patent-for-a-pizza-making-robot/ on Mar. 14, 2018, 3 pages.
Lloyd Pans, "The Equalizer® Multi-Blade Rocker Knife," downloaded from https://lloydpans.com/landing-pages/the-equalizer-pizza-cutter, on Mar. 5, 2019, 4 pages.
Nourish Technology, "Teaching robots how to cook," Downloaded from https://angel.co/nourish-technology on Jul. 12, 2017, 6 pages.
Ohr, "French food tech startup EKIM raises €2.2 million to start the food "robolution"," published online May 22, 2018, downloaded from http://www.eu-startups.com/2018/05/french-food-tech-startup-ekim-raises-e2-2-million-to-start-the-food-robolution/ on Jun. 7, 2018, 2 pages.
Pershan, "Grocery Delivery Startup Tests A.I. to Outsmart Food Waste (and Amazon)" downloaded from https://sf.eater.com/2018/3/19/16427328/farmstead-sf-grocery-delivery-startup-amazon on Mar. 26, 2018, 3 pages.
Shaw, "Robot Investments Weekly: Pizza Robots, Picking Platform Get Pieces of Funding Pie," published online May 25, 2018, downloaded from https://www.roboticsbusinessreview.com/financial/robot-investments-weekly-pizza-robots-earn-slice-of-funding-pie/?utm_source=newsletter&utm_medium=email&utm_campaign=weekly_roundup&eid=399365852&bid=2127951 on Jun. 7, 2018, 4 pages.
Veebie, "Delicious Food. Zero Wait," downloaded from http://www.veebie.me/ on Oct. 20, 2017, 8 pages.

* cited by examiner

SYSTEMS AND METHODS FOR PREPARING FOOD PRODUCTS

CROSS-REFERENCE TO RELATED APPLICATIONS

This application is a continuation of U.S. patent application Ser. No. 16/164,740, filed Oct. 18, 2018, which is a continuation of U.S. patent application Ser. No. 15/040,866, now U.S. U.S. Pat. No. 10,140,587, filed Feb. 10, 2016, which is a division of U.S. patent application Ser. No. 13/920,998, now U.S. Pat. No. 9,292,889, filed Jun. 18, 2013, the entire disclosures of which are incorporated herein by reference in their entireties.

TECHNICAL FIELD

This description generally relates to the delivery of goods that may include the delivery of prepared foods.

DESCRIPTION OF THE RELATED ART

Historically, consumers have had a choice when hot, prepared, food was desired. Some consumers would travel to a restaurant or other food establishment where such food would be prepared and consumed on the premises. Other consumers would travel to the restaurant or other food establishment, purchase hot, prepared, food and transport the food to an off-premises location, such as a home or picnic location for consumption. Yet other consumers ordered delivery of hot, prepared food, for consumption at home. Over time, the availability of delivery of hot, prepared, foods has increased and now plays a significant role in the marketplace. Delivery of such hot, prepared, foods was once considered the near exclusive purview of Chinese take-out and pizza parlors. However, today even convenience stores and "fast-food" purveyors such as franchised hamburger restaurants have taken to testing the delivery marketplace.

The delivery of prepared foods traditionally occurs in several discrete steps. First, a consumer places an order for a particular item with a restaurant or similar food establishment. The restaurant or food establishment prepares the food per the customer order. The prepared food is packaged and delivered to the consumer's location. The inherent challenges in such a delivery method are numerous. In addition to the inevitable cooling that occurs while the hot food is transported to the consumer, many foods may experience a commensurate breakdown in taste, texture, or consistency with the passage of time. For example, the French fries at the burger restaurant may be hot and crispy, but the same French fries will be cold, soggy, and limp by the time they make it home. To address such issues, some food suppliers make use of "hot bags," "thermal packaging," or similar insulated packaging, carriers, and/or food containers to retain at least a portion of the existing heat in the prepared food while in transit to the consumer. While such measures may be at least somewhat effective in retaining heat in the food during transit, such measures do little, if anything, to address issues with changes in food taste, texture, or consistency associated with the delay between the time the food is prepared and the time the food is actually consumed.

BRIEF SUMMARY

Systems and methods of coordinating the preparation and delivery of cooked foods are disclosed. In at least some instances, the systems and methods described herein take advantage of the estimated travel time to any number of food delivery destinations. Uncooked or partially cooked food, prepared to the consumer's specifications, is placed in an individual cooking unit or oven which is loaded into the cargo compartment of a delivery vehicle. The cooking conditions within the cooking unit or oven (e.g., cooking unit temperature, cooking unit humidity, cooking time, and similar) are dynamically controlled and adjusted while enroute to the consumer destination such that the cooking process for food delivered to a particular consumer is completed a short time prior to the arrival of the food at the destination. Using such a system, hot prepared food that is freshly cooked can be delivered to a consumer shortly after the conclusion of the cooking process.

Advantageously, delivery of hot, prepared, foods to a plurality of consumer destinations may be accomplished by loading the uncooked or partially cooked food, prepared per a generated order or per an order received from each respective consumer, into each of a plurality of individual cooking units. The cooking conditions in each of the cooking units may be individually adjusted, making possible the tailoring of cooking conditions (temperature, time, humidity, etc.) in each cooking unit such that the food in the cooking unit is completed shortly before arrival at each respective consumer destination. Such a system also permits the dynamic adjustment of cooking conditions in each of the cooking units while enroute to accommodate changes in delivery times based on the occurrence of external events such as traffic accidents, congestion, or other delays. Advantageously, each customer destination will receive hot, prepared, food shortly after the cooking process has completed. Present food delivery systems do not provide this level of food quality or delivery service.

The self-contained cooking units or ovens may be individually placed in the delivery vehicle. In other instances, multiple cooking units may be loaded into a structure such as a rack that is loaded into the delivery vehicle. In the delivery vehicle, each of the cooking units is powered and the food contained in the cooking unit cooked. Cooking conditions in each cooking unit are determined by a controller based on the food product in the cooking unit and the estimated delivery time to the consumer destination. The controller used to adjust the cooking conditions may be contained in the respective cooking unit. In other instances a single controller may be used to control some or all of the cooking units in a delivery vehicle via a wired controller (e.g., a controller mounted in the delivery vehicle) or wireless controller (e.g., a controller mounted remote from the delivery vehicle) that is communicably coupled to each individual cooking unit. The cooking conditions within each cooking unit can be adjusted or varied by the controller to reflect changes in consumer delivery location, vehicle routing, and vehicle location information.

The use of a central controller may advantageously permit the generation of both a delivery itinerary (i.e., a delivery route) and an estimated time of arrival at each of the consumer destinations. Data in the form of live updates may be provided to the controller to permit continuous, near-continuous, or intermittent adjustments to the cooking conditions. For example, real-time or near real-time crowd sourced traffic information, may be used to provide updated estimated times of arrival or to recalculate the delivery itinerary. Knowing the estimated delivery time and the desired cooking conditions, the controller varies the cooking conditions within each of the individual cooking units such that the cooking process in the respective cooking unit is completed at the approximate estimated time of arrival at the respective consumer location.

As the delivery vehicle nears or arrives at the consumer destination, the hot, prepared food in the cooking unit logically associated with the destination, the cooking unit can be switched off or lowered to a warming temperature. After switching off the cooking unit, the food items contained therein can be automatically transferred from the cooking unit to an appropriate package or transport container. Typical transport containers include cardboard containers (e.g., pizza boxes); Styrofoam containers; paper containers; plastic containers; metal containers; aluminum foil containers; and the like. The transfer of food from the cooking unit to the transport container is beneficially accomplished using automated devices which do not require human intervention. For example, an automated paddle may be used to transfer pizza from a cooking unit to a cardboard box transport container for delivery to the consumer. Alternatively, scissors-type pusher blades may be used to slide food from the cooking unit to the transport container for delivery.

In addition to advantageously providing delivery of freshly cooked food, the use of such delivery systems and methods permits a degree of personalization of the delivery experience for the consumer. For example, making the order history of a particular consumer accessible to the delivery driver enables the delivery driver to discuss current and future promotional offers that may be of interest to the consumer. Tracking and trending order information may also enable the predictive preparation and prompt delivery of hot prepared foods on certain days or on certain occasions, thereby providing a heretofore unavailable level of customer service that can serve as a key market differentiator. For example, on certain days (e.g. Friday evenings) and/or times "game day" orders for a certain food (e.g., pepperoni pizzas) may increase. The predicted increase may be generic to a delivery area or may be concentrated to certain geographic areas. With this knowledge, one can stock the particular food in respective cooking units in delivery vehicles in anticipation of receiving orders for such food. The pre-order stocking or caching may be based on previous demand and may be specific to food item, day, time, geographic location or even events. For instance, each delivery vehicle may be pre-order stocked with several cheese and several pepperoni pizzas on game days for a local team, or during national events like the Super Bowl®, World Series®, or college team bowl games.

In at least some instances, some or all of the interior food contact surfaces of the cooking unit can be removed for cleaning and sanitization in one or more central locations. For example, a removable ceramic "cooking stone" or similar material may be used to line the food contact portions of the cooking unit. Upon return from a consumer delivery, the ceramic cooking stone can be removed from the cooking unit and placed in a cleaning/sanitization station for cleaning prior to reuse. New food products can be manually or automatically made on the sanitized cooking stone and the uncooked food and cooking stone can be placed in a cooking unit for transport and delivery to a consumer location.

A portable cooking and delivery system may be summarized as including a vehicle having a cargo compartment; an oven rack sized and dimensioned to be received in the cargo compartment of the vehicle, the oven rack securable in the cargo compartment of the vehicle; and a plurality of individual ovens held by the rack, each of the ovens having a respective heating element and at least one wall that forms an interior which is thermally insulated from an exterior thereof and which is thermally insulated from the respective interior of each other ones of the ovens, the ovens each operable at respective temperatures which are independently settable from one another.

The portable cooking and delivery system may further include at least one controller that controls at least one of a temperature or a cooking time for the ovens in response to an estimated transit time. The portable cooking and delivery system may further include a radio communicatively coupled to the at least one controller to provide signals indicative of at least one of a temperature or a cooking time for at least one of the ovens, the signals received from a remote stationary source. The portable cooking and delivery system may further include at least one controller that dynamically controls at least one of a temperature or a cooking time for at least one of the ovens in response to a dynamically updated estimated transit time of the vehicle to a delivery destination for the contents of the respective oven. The at least one controller may stop the cooking of the contents of the oven when a defined cooking time is reached for a set of temperatures at which the respective oven was operated during at least part of a transit of the vehicle. The at least one controller may stop the cooking of the contents of the oven when a defined cooking time is reached for a set of temperatures at which the respective oven was operated during at least part of a transit of the vehicle based on the dynamically updated estimated transit time to a delivery destination of the contents of the respective oven. The portable cooking and delivery system may further include a radio communicatively coupled to the at least one controller to provide signals indicative of at least one of a dynamically updated temperature or a dynamically updated cooking time for at least one of the ovens, the signals received from a remote stationary source. The portable cooking and delivery system may further include at least one transducer positioned to sense at least one operational condition of at least one of the ovens, the at least one transducer communicatively coupled to the radio to provide signals to the remote stationary source indicative of the sensed at least one operational condition of at least one of the ovens. The vehicle may include an electrical power source electrically coupled to supply electric power to a drive system of the vehicle. The portable cooking and delivery system may further include an auxiliary power unit operable to provide power to the respective heating element of the ovens independent of the electrical power source that supplies electric power to the drive system of the vehicle. The portable cooking and delivery system may further include a reservoir of a combustible gas, wherein the auxiliary power unit is fluidly communicatively coupled to the reservoir of the combustible gas and burns the combustible gas to produce electrical power, and the auxiliary power unit is electrically coupled to the heating elements of the ovens. The portable cooking and delivery system may further include a packaging rack sized and dimensioned to be received in the cargo compartment of the vehicle, the packaging rack having a number of compartments sized and dimensioned to each hold packaging; and a transfer mechanism operable to mechanically transfer contents of the oven to respective packaging held by the packaging rack without the contents being touched by a human. The at least one controller may automatically cause the transfer mechanism to mechanically transfer the contents of the oven to the respective packaging held by the packaging rack in response to a defined time being reached for cooking the contents of the oven at a defined temperature as specified by a cooking schedule. The packaging rack may include a plurality of slots, each slot sized and dimensioned to releasably hold a respective box, the boxes sized and dimensioned to receive the contents of a respective one of the ovens, and the transfer mechanism may include at least one mechanical arm selectively moveable between a retracted configuration and an expanded configuration. The portable cooking and delivery system may further include a securement structure in the cargo compartment of the vehicle that releasably secures the packaging rack in the cargo compartment. The portable cooking and delivery system may further include a securement structure in the cargo compartment of the vehicle that releasably secures the oven rack in the cargo compartment. At least one of the ovens may include a stone or ceramic or earthenware floor. At least one of the ovens may include a stone or ceramic or earthenware ceiling. The heating elements of at least one of ovens may be an electric heating element. At least one of the ovens may include an ejector moveable between a retracted configuration and an expanded configuration, wherein movement of the ejector from the retracted configuration to the expanded configuration moves the contents of the oven out of the oven without the contents being touched by a human. The at least one controller may cause the ejector to move the contents of the oven out of the oven without the contents being touched by a human in response to reaching a defined cooking time for a set of temperatures at which the respective oven was operated during at least part of a transit of the vehicle based on a dynamically updated estimated transit time to a delivery destination of the contents of the respective oven. At least one of the ovens may include an ejector moveable between a retracted configuration and an expanded configuration, wherein the ejector is selectively positionable based on a dimension of the contents of the oven to bias the contents of the oven against movement during transit of the vehicle. The oven rack may have oven securement structures that removably releasably secure the ovens in the oven rack. The oven rack wherein at least one of the oven rack or the ovens may have visual indicators spatially associated with respective ones of the ovens and which are indicative of a cooking status of the contents of the respective oven. The vehicle may be at least one of an electric vehicle or a hybrid vehicle, the vehicle may have a number of door locks and a starter which are each responsive to a presence of a wireless transponder in a proximity thereof.

A method of operation in a food preparation and delivery system may be summarized as including loading each of a plurality of food items in a respective one of a plurality of ovens; positioning the plurality of ovens in a cargo compartment of a vehicle; and for each of the ovens, automatically controlling by at least one controller at least one of a temperature or a cooking time based at least in part on an estimated time to destination for the respective food item to cook the food items in the ovens while the vehicle travels to each of at least two destinations which are different from one another.

The method may further include generating a signal by the at least one controller that stops the cooking of the contents of the oven when a defined cooking time is reached for a set of temperatures at which the respective oven was operated during at least part of a transit of the vehicle. Automatically controlling at least one of a temperature or a cooking time based at least in part on an estimated time to destination for the respective food item may include automatically controlling by the at least one controller at least one of the temperature or the cooking time based at least in part on a dynamically estimated time to destination, updated as the vehicle travels to the destinations. The method may further include generating a signal by the at least one controller that stops the cooking of the contents of the oven when a defined cooking time is reached for a set of temperatures at which the respective oven was operated during at least part of a transit of the vehicle. The method may further include generating a signal by the at least one controller that stops the cooking of the contents of the oven when a defined cooking time is reached for a set of temperatures at which the respective oven was operated during at least part of a transit of the vehicle based on the dynamically updated estimated transit time to a delivery destination of the contents of the respective oven. The method may further include automatically mechanically transferring, by at least one transfer mechanism, the contents of the oven to a respective package held by a packaging rack. The method may include generating a signal by the at least one controller that causes the at least one transfer mechanism to automatically mechanically transfer the contents of the oven to the respective package in response to a defined time being reached. The method may include generating a signal by the at least one controller that causes the at least one transfer mechanism to automatically mechanically transfer the contents of the oven to the respective package in response to a defined time being reached for cooking the contents of the oven at a defined temperature as specified by a cooking schedule. The method may include generating a signal by the at least one controller that causes the at least one transfer mechanism to automatically mechanically transfer the contents of the oven to the respective package in response to a defined time being reached for a set of temperatures at which the respective oven was operated during at least part of a transit of the vehicle based on a dynamically updated estimated transit time to a delivery destination of the contents of the respective oven. At least one of the ovens may include an ejector moveable between a retracted configuration and an expanded configuration, and further comprising: moving the ejector from the retracted configuration toward the expanded configuration to move the contents of the oven out of the oven without the contents being touched by a human. At least one of the ovens may include an ejector moveable between a retracted configuration and further comprising: positioning the ejector based on a dimension of the contents of the oven to bias the contents of the oven against movement during transit of the vehicle. The method may further include securing the ovens in at least one oven rack before positioning the plurality of ovens in the cargo compartment of the vehicle; and securing the at least one oven rack in the cargo compartment of a vehicle to position the plurality of ovens in the cargo compartment of the vehicle. The method may further include producing the plurality of food items without the food items being touched by a human, and wherein the loading each of a plurality of food items in a respective one of a plurality of ovens occurs without the food items being touched by a human. The producing the plurality of food items may be responsive only to receipt of new orders for the food item. The method may further include analyzing previously delivered orders for food items to predict future orders for food items, and wherein the producing the plurality of food items is responsive to receipt of new orders for the food item and to predicted future orders for food items. The method may further include caching at least one unordered food item in an oven on the vehicle in anticipation of a new order for the food item. The method may further include for each of a number of customers, providing images of at least one of the producing or cooking of a specific instance of the food item to be delivered to the customer. The method may further include capturing images of the producing of the food items; and capturing images of the cooking of the food items in the respective ovens; and providing a selectable link selection of which provides access to the captured images of the specific instance of the food item to be delivered to the respective customer. The method may further include tracking a location of at least one of the vehicle or the food items; and for each of a number of customers, providing a selectable link selection of which provides access to the location of the vehicle carry the food item to be delivered to the respective customer or the location of the food item to be delivered to the respective customer. The method may further include tracking a location of at least one of the vehicle or the food items; and for each of a number of customers, providing an indication of a dynamically adjusted estimated delivery time for delivery of the food item to be delivered to the respective customer. Providing an indication of a dynamically adjusted estimated delivery time for delivery of the food item to be delivered to the respective customer may further include providing the indication with a representation of a confidence interval. The method may further include in response to reaching each destination, presenting a visual identification via at least one light source to a delivery person of at least one oven which contains the food item intended for delivery at the respective destination. The method may further include in response to reaching at least one destination, presenting a set of information associated with the destination via at least one user interface to a delivery person. Presenting a set of information associated with the destination via at least one user interface to a delivery person may include presenting a set of information that identifies a customer name, customer specific preferences, customer birth date, or a most recent previous order. The method may further include detecting at least one operational condition of at least one of the ovens; wirelessly transmitting the detected at least one operation condition to a fixed site remote from the vehicle; and wirelessly receiving updated cooking information from the fixed remote site. Detecting at least one operational condition of at least one of the ovens may include detecting at least one of a temperature in an interior of the oven, a temperature of the food item in the oven, a respective temperature at a plurality of locations inside the oven, or a moisture content inside the oven. The method may further include adjusting routing of a plurality of vehicles based dynamically adjusted estimated transit times to load balance between the vehicles. The method may further include receiving an indication as to which food item of the set of at least two food items a customer identifies as likely to be delivered first out of the set of at least two food items; determining which of the food items of the at least two food items is actually delivered first; awarding the customer if the customer correctly identified the food item that is actually delivered first of the set of food items. The method may further include providing the set of food items to the customer for identification, the set including at least one instance of a food item to be delivered to the customer. Providing the set of food items to the customer for identification may include providing the set including at least one instance of a food item to be delivered to a random selected customer.

A portable cooking and delivery system may be summarized as including a vehicle; a plurality of individual ovens carried by the vehicle, each of the ovens having a respective heating element and at least one wall that forms an interior which is thermally insulated from an exterior thereof and which is thermally insulated from the respective interior of each other ones of the ovens, the ovens each operable at respective temperatures which are independently settable from one another; a packaging array carried by the cargo vehicle and which holds packaging; and a transfer mechanism operable to mechanically transfer contents of the oven to respective instances of packaging held by the packaging array without the contents being touched by a human.

The portable cooking and delivery system may further include at least one controller that dynamically controls at least one of a temperature or a cooking time for at least one of the ovens in response to a dynamically updated estimated transit time of the vehicle to a delivery destination for delivery of the contents of the respective oven. The at least one controller may stop the cooking of the contents of the oven when a defined cooking time is reached for a set of temperatures at which the respective oven was operated during at least part of a transit of the vehicle. The at least one controller may stop the cooking of the contents of the oven when a defined cooking time is reached for a set of temperatures at which the respective oven was operated during at least part of a transit of the vehicle based on the dynamically updated estimated transit time to a delivery destination of the contents of the respective oven. The portable cooking and delivery system may further include a radio communicatively coupled to the at least one controller to provide signals indicative of at least one of a dynamically updated temperature or a dynamically updated cooking time for at least one of the ovens, the signals received from a remote stationary source; and at least one transducer positioned to sense at least one operational condition of at least one of the ovens, the at least one transducer communicatively coupled to the radio to provide signals to the remote stationary source indicative of the sensed at least one operational condition of at least one of the ovens. The portable cooking and delivery system may further include an auxiliary power unit operable to provide power to the respective heating element of the ovens independent of the electrical power source that supplies electric power to the drive system of the vehicle. At least one of the ovens may include an ejector moveable between a retracted configuration and an expanded configuration, wherein movement of the ejector from the retracted configuration to the expanded configuration moves the contents of the oven out of the oven without the contents being touched by a human, and the at least one controller causes the ejector to move the contents of the oven out of the oven without the contents being touched by a human in response to reaching a defined cooking time for a set of temperatures at which the respective oven was operated during at least part of a transit of the vehicle based on a dynamically updated estimated transit time to a delivery destination of the contents of the respective oven.

A system to cook and delivery consumables may be summarized as including at least one non-transitory processor-readable medium that stores at least one of processor executable instructions or data; at least one processor communicatively coupled to the at least one non-transitory processor-readable medium to at least one of read or write at least one of processor executable instructions or data therefrom or thereto, the at least one processor which in use: for each of a plurality of vehicles, determines an estimated transit time for the respective vehicle to each of a plurality of destinations to be visited during a route that starts and ends at a content loading location, and for each of at least some of a plurality of ovens carried by each one of the plurality of vehicles, determines at least one of a respective cooking temperature or cooking time to cook a respective content of the oven, based at least in part an estimated transit time for the respective vehicle to the respective one of the destinations to which the respective content of the oven is to be delivered; and a number of communications ports communicatively coupled to at least provide to the plurality of vehicles information indicative of at least one of a respective cooking temperature or cooking time to cook a respective content of at least some of the ovens carried by the respective vehicle.

The at least one processor may dynamically determine the estimated transit time for the respective vehicle to each of a plurality of destinations to be visited during the route based at least in part on updated location information for the respective vehicle. The at least one processor may dynamically determine the estimated transit time for the respective vehicle to each of a plurality of destinations to be visited during the route based at least in part on updated traffic information for the respective route the vehicle is to transit. The at least one processor may dynamically determine the estimated transit time for the respective vehicle to at least one of the plurality of destinations to be visited during the route based at least in part on an update of the respective route the vehicle is to transit. For at least one vehicle, the at least one processor may update the respective route the vehicle is to transit, and may dynamically determine the estimated transit time for the respective vehicle to each of at least some of the plurality of destinations to be visited during the route based at least in part on the updated respective route the vehicle is to transit. For at least one vehicle, the at least one processor may detect a variance in the transit of the respective route the vehicle is transiting, and may dynamically determine the estimated transit time for the respective vehicle to each of at least some of the plurality of destinations to be visited during the route based at least in part on the detected variance in the transit of the respective route that the vehicle is transiting. For at least one vehicle, the at least one processor: may identify an order for content that matches the content of at least one oven carried by the vehicle for which there is no destination assigned, and may update the respective route the vehicle based at least in part on the order to add a destination for content that matches the content of at least one oven carried by the vehicle for which there was no destination assigned. For the at least one vehicle, the at least one processor may dynamically determine the estimated transit time for the respective vehicle to each of at least some of the plurality of destinations to be visited during the route based at least in part on the updated respective route the vehicle is to transit. The at least one processor may analyze a plurality of actual previous orders based at least in part on day, time, content type; and assigns to at least one of the vehicles at least one oven containing content for which there is no destination assigned based at least in part on the analysis of the plurality of actual previous orders and a predicted demand for a day and time. The at least one processor may determine a respective revised route for at least some of the vehicles, the revised routes moving at least one destination from a route to be transited by a first one of the vehicles to a route to be transited by a second one of the vehicles. For at least the first and the second ones of the vehicles, the at least one processor may dynamically determine the estimated transit time for the respective vehicle to each of at least some of the plurality of destinations to be visited based at least in part on the revised respective route the vehicle is to transit. The at least one processor may determine the respective revised route for at least some of the vehicles in response to at least one of: receipt of a new order or a change in a previously received order which has not yet been delivered. The at least one processor may determine the respective revised route for at least some of the vehicles in response to detection of an actual delay in the transit of at least one of the vehicles greater than a defined threshold delay. The at least one processor may determine the respective revised route for at least some of the vehicles in response to detection of a predicated delay in the transit of at least one of the vehicles greater than a defined threshold delay based on traffic information. The number of communications ports may be communicatively coupled to receive location information indicative of a current location of the plurality of vehicles, and the at least one processor may determine the traffic information in at least almost real-time based at least in part on actual transit times of the plurality of vehicles. On reaching each destination the at least one processor may cause a user interface to present information that indicates, in addition to an individual's name associated with the order or the destination address, at least one piece of personal information associated with at least one individual or the destination address. On reaching each destination the at least one processor may cause a user interface to present information that indicates, in addition to an individual's name associated with the order or the destination address, at least a portion of an order history for the destination address. On reaching each destination the at least one processor may cause a user interface to present information that indicates, in addition to an individual's name associated with the order or the destination address, at least a portion of an order history for individual, independent of the destination address. The number of communications ports may be communicatively coupled to receive: a number of predictions indicative of when one delivery will be made with respect to at least one other delivery, and location information indicative at least of when deliveries are actually made; and the at least one processor may cause issuance of rewards for correct predictions. The number of predictions may be indicative of a prediction by a respective customer of when the respective customer will receive an order relative to at least one other customer; and the at least one processor may cause issuance of a discount in response to the prediction by the respective customer being correct. The at least one processor may cause provision of location information to a customer for at least some of the vehicles only after receipt of a prediction by the customer. The at least one processor may cause provision of location information to a customer for at least some of the vehicles without providing any indication of order ranking for the respective vehicle. The at least one processor may cause provision of an estimated time to deliver for an order with a representation of confidence in the estimated time to delivery.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
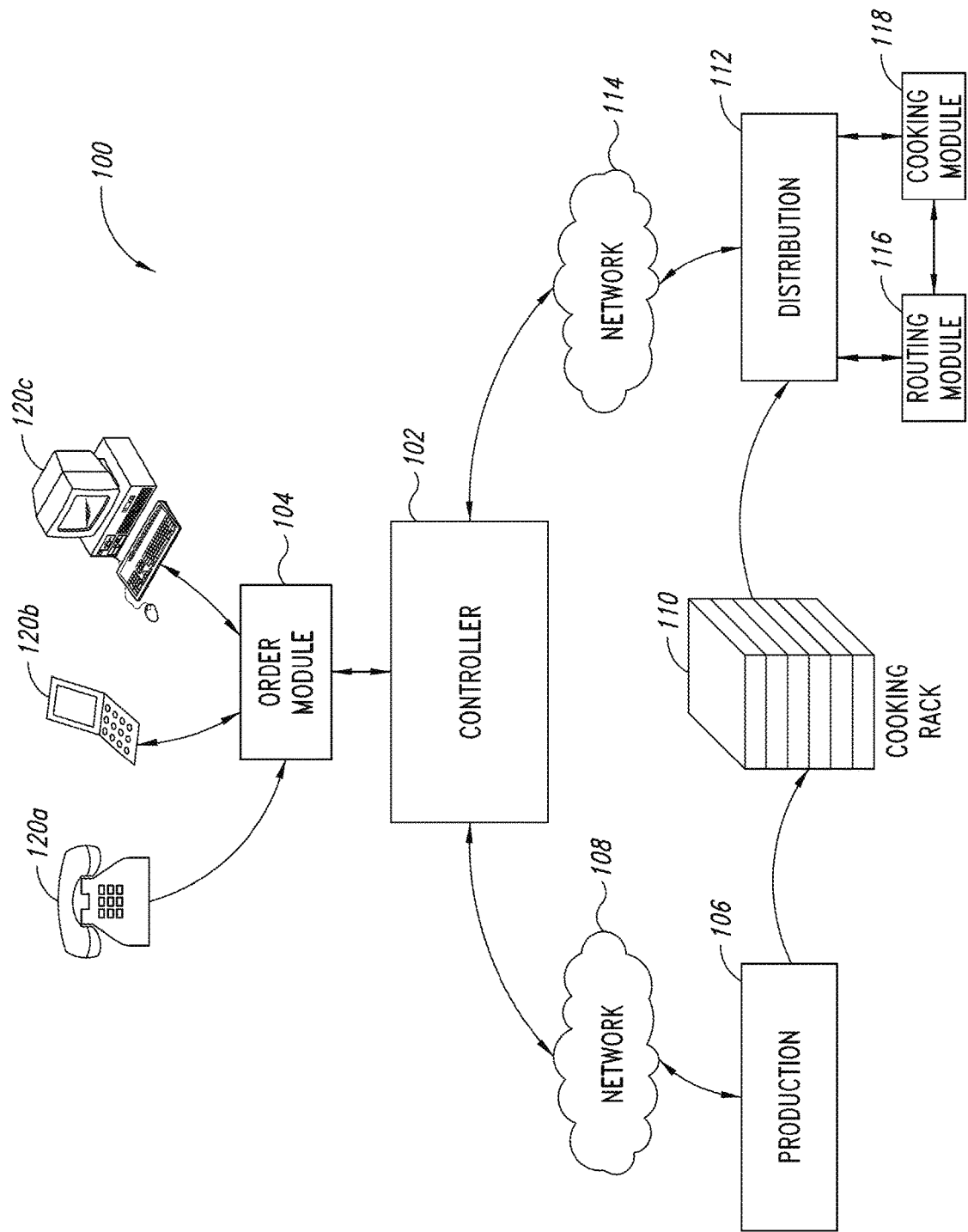
FIG. 1 is a schematic diagram of a food delivery environment that includes a central controller communicably coupled to order entry, food production, and food distribution modules, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with food preparation devices such as ovens, skillets, and other similar devices, closed-loop controllers used to control cooking conditions, food preparation techniques, wired and wireless communications protocols, geolocation, and optimized route mapping algorithms have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

As used herein the term "food" refers to any product intended for human consumption. Although illustrated and described herein in the context of pizza to provide a readily comprehensible and easily understood description of one illustrative embodiment, one of ordinary skill in the culinary arts and food preparation will readily appreciate the broad applicability of the systems, methods, and apparatuses described herein across any number of prepared food products.

As used herein the term "cooking unit" refers to any device, system, or combination of systems and devices useful in the preparation of a food product. While such preparation may include the heating of food products during preparation, such preparation may also include the partial or complete cooling of one or more food products. Additionally, while the term "oven" may be used interchangeably with the term "cooking unit" herein, such usage should not limit the applicability of the systems and methods described herein to only foods preparable in an oven. For example, a hot skillet surface can be considered a "cooking unit" or an "oven" that is included within the scope of the systems, methods, and apparatuses described herein. Further, the cooking unit may be able to control more than temperature. For example, some cooking units may control pressure and/or humidity. Further, some cooking units may control airflow therein, thus able to operate in a convective cooking mode if desired, for instance to decrease cooking time.

Description of Delivery System Environments

FIG. 1 shows a delivery system environment 100 according one illustrated embodiment. The delivery system includes at least one controller 102, an order module 104, a production module 106 communicably coupled to the controller via a network 108, and a distribution module 112 communicably coupled to the controller 102 via a network 114. In at least some implementations, a cooking rack 110 can be used to transfer cooking units containing prepared food items between the production module 106 and the distribution module 108. A routing module 116 and a cooking module 118 are shown communicably coupled to each other and to the distribution module 114. Although illustrated as discrete components, some or all of the functions performed by the order module 104, production module 106, distribution module 112, routing module 116, and cooking module 118 may be shared between or combined and performed by another system component. For example, the controller 102 may perform various order entry functions rather than a dedicated order entry module 104.

The controller 102 can include one or more systems or devices used to coordinate the receipt or generation of food item orders. In at least some instances, the order entry module 104 can receive food orders placed by consumers using any number or variety of sources. In some instances, the order entry module 104 may include a telephonic interface to conventional or voice over Internet Protocol (VoIP) telephonic equipment 120a. Such telephonic interfaces may be in the form of automated or semi-automated interfaces where the consumer enters data by entering a defined key sequence corresponding to a desired food product, destination address, delivery time, etc. Some telephonic interfaces may include an attendant operated interface where the consumer places a verbal order with the attendant who then enters data corresponding to a desired food product, destination address, delivery time, etc. into the controller 102, for example using a touchscreen or keyboard entry device. In some instances, the order entry module 104 may include a network interface, for example a network interface communicably coupled to the Internet, over which orders may be placed via smartphone 120b, or via any type of computing device 120c. In such instances, order information corresponding to a desired food item, destination address, delivery time, and the like may be provided by the consumer in a format requiring minimal or no reformatting by the order module 104 prior to providing the data representative of the order to the controller 102.

In various implementations, in addition to receiving consumer orders via telephone 120a, smartphone 120b, or computer 120c, the controller 102 can do more than simply aggregate received consumer food item orders. For example, the controller 102 may include one or more machine learning or similar algorithms useful for predicting the demand for certain food items. For example, the controller 102 may include one or more machine learning algorithms able to correlate or otherwise logically associate the ordering of a number of particular food items (e.g., pepperoni pizzas) in a constrained geographic area (e.g., a college campus) over the course of a defined temporal period (e.g., Friday evenings between 9:00 PM and 12:00 AM) or during one or more defined events (e.g., during a football or basketball game in which the college is represented). In such instances, the controller 120 may autonomously generate orders for production of the particular food items in anticipation of orders that will be, but have not yet, been received.

In at least some instances, the controller 102 can provide the consumer placing an order for a food item with an estimated delivery time for the item. In at least some instances, the estimated delivery time may be based on the time to produce the food item in the production module plus the estimated time to cook the food item in transit by the distribution module 112. Such estimated delivery times may take into account factors such as the complexity of preparation and the time required for the desired or defined cooking process associated with the ordered food item. Such estimated delivery times may also take into account factors such as road congestion, traffic, time of day, and other factors affecting the delivery of the food item by the distribution module 112. In other instances, the estimated delivery time may reflect the availability of the ordered food item on a delivery vehicle that has been pre-staged in a particular area.

The controller 102 can schedule the production of food items in accordance with the received or generated orders. In some instances, the controller 102 may be collocated with or even incorporated into the production module 106. Responsive to receipt of one or more outputs provided by the controller 102, food items are prepared or assembled within the production unit 106. In at least some instances, the production module 106 may autonomously perform the preparation or assembly of at least a portion of the uncooked food products at the direction of the controller 102. For example, crust dough may be kneaded and formed, sauce spread and cheese and pepperoni placed on top of the sauce using one or more automated or semi-automated systems upon receipt or generation of food item order data indicative of a pepperoni pizza by the controller 102. Each of the prepared or assembled food items provided by the production module 106 can be loaded or otherwise placed into one or more cooking units. The cooking units can then be placed into a cooking rack 110 to transfer the prepared or assembled food items from the production module 106 to the delivery module 108.

In some instances, the controller 102 may be a portion of or may be communicably coupled to an inventory control or enterprise business system such that the inventory of food ingredients and other items is maintained at one or more defined levels within the production module 106. In some instances, where the controller 102 and the production module 106 are discrete entities, the network 108 communicably coupling the controller 102 to the production module 106 can be a wired network, a wireless network, or any combination thereof. The network 108 can include a local area network, a wide area network, a worldwide network, a private network, a corporate intranet, a worldwide public network such as the Internet, or any combination thereof. In at least some instances, all or a portion of the controller 102 can be located remote from the production module 106, for example in a corporate server, or in a network connected or "cloud" based server.

The cooking units containing the prepared, uncooked, food items can be placed in a cooking rack 110. The cooking rack 110 can include various components or systems to support the operation of the cooking units contained in the rack, for example a power distribution bus, a communications bus, and the like. Within the distribution module 112, power and cooking condition instructions are supplied to the cooking units either individually or via the power distribution and communications buses in the cooking rack.

Cooking conditions within each of the cooking units are controlled enroute to the consumer destination such that the food in the cooking unit is cooked shortly prior to or upon arrival at the consumer destination. In at least some instances the controller 102 can communicate via network 114 with the distribution module 112 to control some or all cooking conditions and cooking functions in each of the cooking units. In some instances, the controller 102 can also determine an optimal delivery itinerary, estimated delivery times, and available cooking times for each cooking unit. In other instances a routing module 116 communicably coupled to the distribution module 112 can provide some or all of the delivery routing instructions, including static or dynamic delivery itinerary preparation and time of arrival estimates that are used to determine the available cooking time and to control or otherwise adjust cooking conditions within the cooking units. In some instances, a cooking module 118 communicably coupled to the distribution module 112 can provide some or all of the adjustments to cooking conditions within the cooking units such that the food items in each of the respective cooking units are cooked shortly before arrival at the consumer destination. In at least some instances, the cooking module 118 may use data provided by the routing module 116 to determine cooking conditions within some or all of the cooking units 210. In yet other instances, standalone loop controllers may be located within each cooking unit to control some or all functions including power delivery and/or cooking conditions in the respective cooking unit.

In at least some instances, the location of each cooking unit or cooking rack 110 in the distribution module 112 may be monitored using geolocation information. Such geolocation information may be determined through the use of time-of-flight triangulation performed by the controller 102 and/or routing module 116. Such geolocation information may be determined using one or more global positioning technologies, for example the Global Positioning System (GPS) or similar. The controller 102, the routing module 116, and/or the cooking module 118 may use the location information to statically or dynamically create and/or update delivery itinerary information and estimated time of arrival information for each consumer destination. The controller 102 and/or the cooking module 118 may use such information to control or otherwise adjust the cooking conditions in some or all of the cooking units 210. In at least some instances, all or a portion of the determined geolocation information associated with a consumer's food item(s) may be provided to the consumer, for example via a Website, computer program, or smartphone application.

The system 100 advantageously and significantly reduces the time required for delivery of prepared food items to consumer destinations by cooking or completing the cooking of food items within the distribution module 112 rather than the production module 106. For example, the cooking of food items can be completed using individually controllable cooking units on a delivery vehicle instead of a more conventional stationary cooking unit such as a range or oven located in the production module 106. By moving at least a portion of the cooking process to the production module 112, the overall time required to prepare, cook, and deliver food items to a consumer location is reduced and the overall quality of the delivered food items is improved. Significantly, the time for delivery and quality of delivered food is improved over current systems in which food items are cooked in a central location and then loaded onto a delivery vehicle for delivery to the consumer location. Even more advantageously, by dynamically adjusting the delivery itinerary and controlling the cooking conditions within the cooking units to reflect the updated expected arrival times at the consumer locations, the impact of unanticipated traffic and congestion on the quality of the delivered food items is beneficially reduced or even eliminated.

Figure 2A:
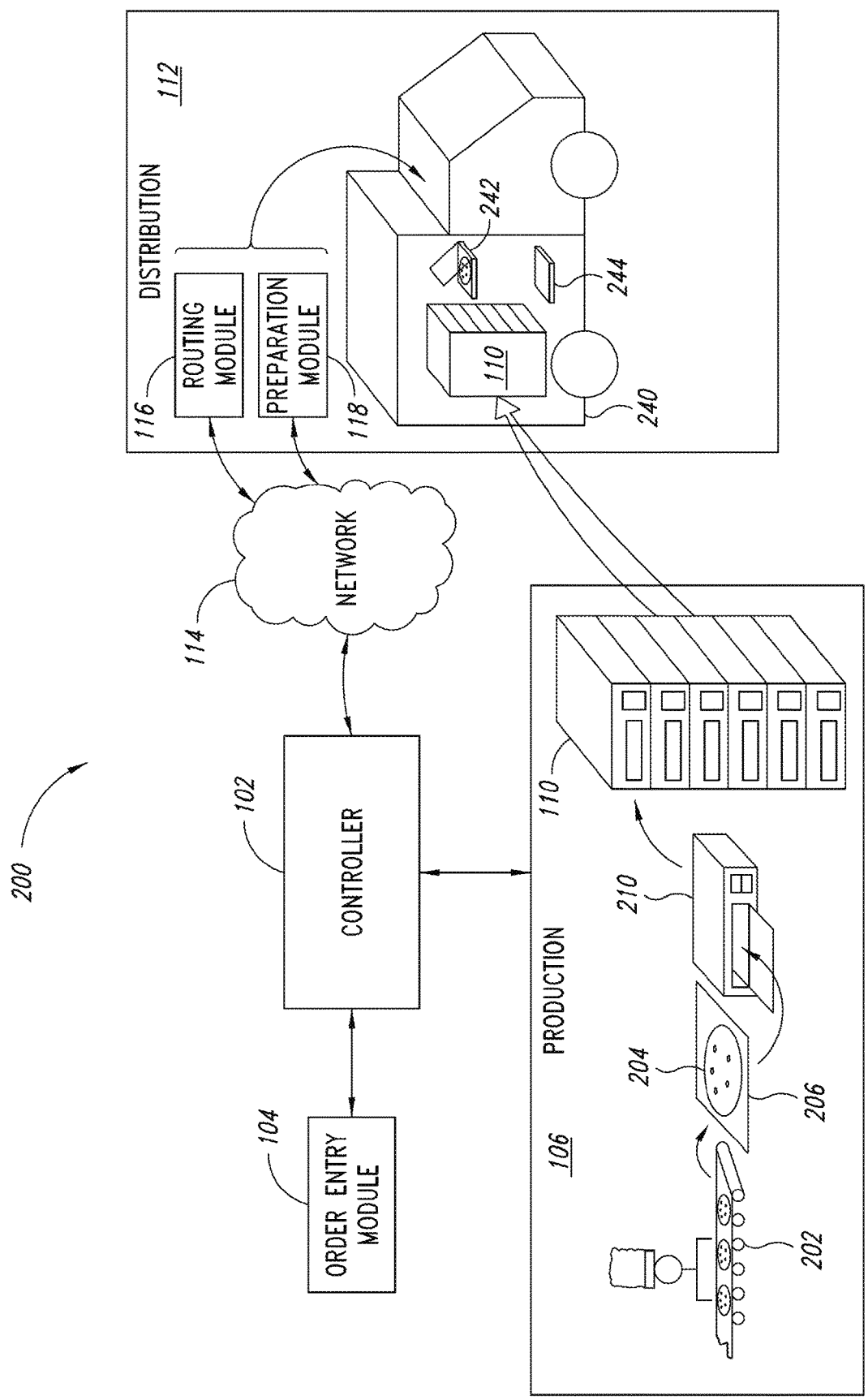
FIGS. 2A, 2B and 2C are schematic diagrams of a food delivery environment such as that depicted in FIG. 1 that show a food production module in which food is prepared and loaded into cooking units (e.g., ovens) that are loaded into cooking racks that are, in turn, loaded into a delivery vehicle where the food is cooked under controlled conditions while enroute to the consumer destination, according to one illustrated embodiment.
Figure 2B:
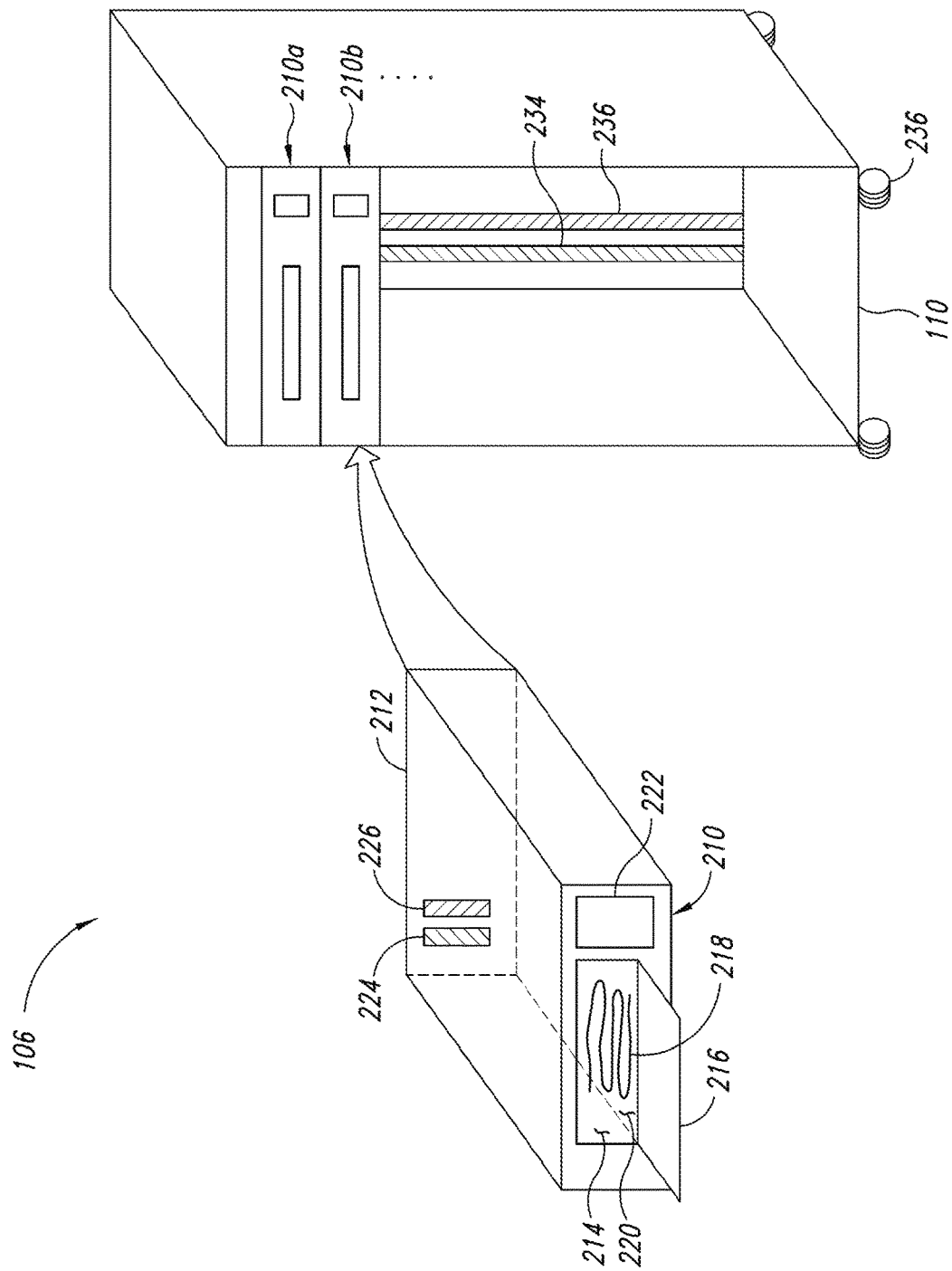
Figure 2C:
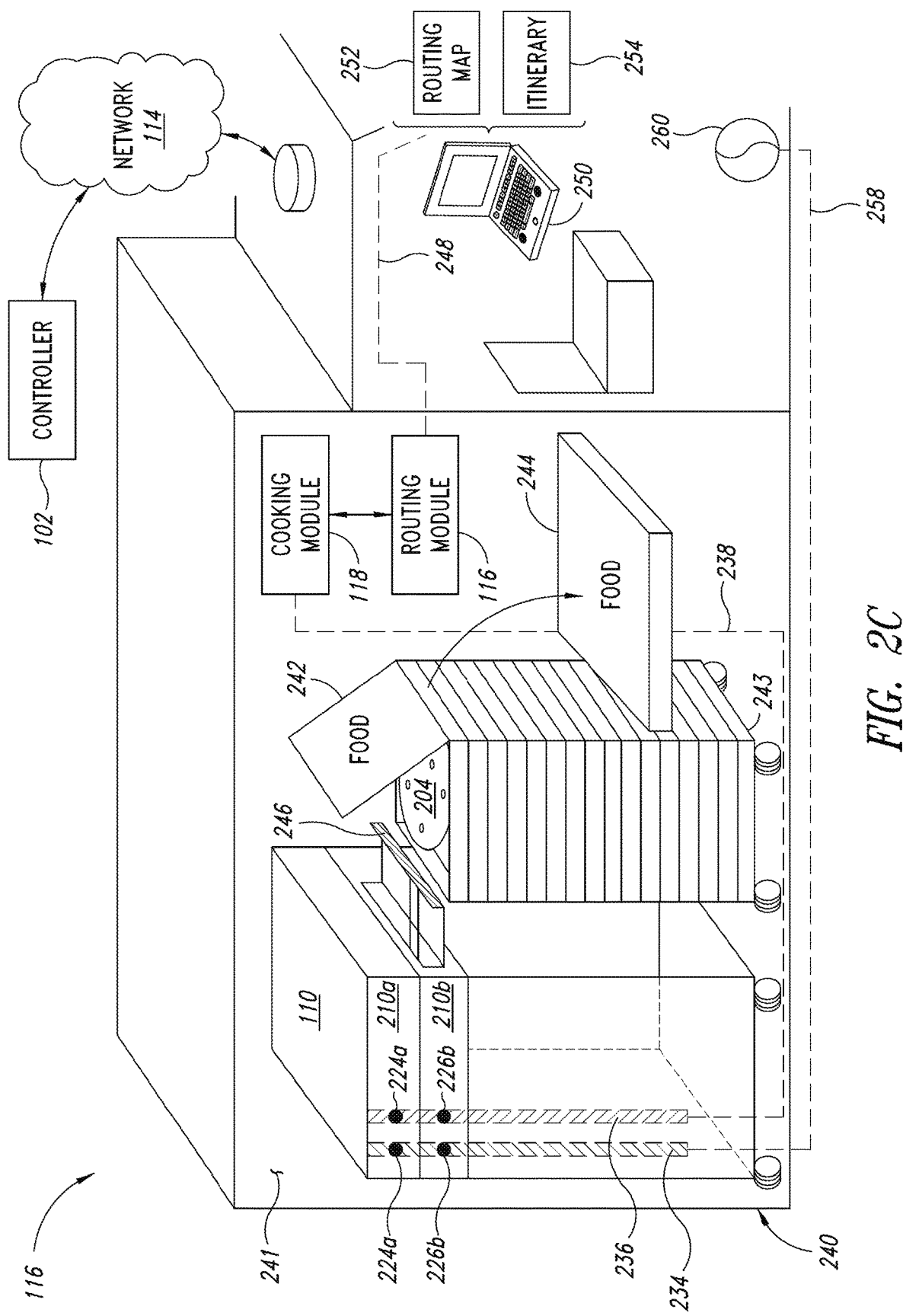

FIGS. 2A, 2B, and 2C depict an illustrative food preparation and delivery system 200 in which food items 204 are prepared in the preparation module 106 and loaded into cooking units 210 which can be placed in cooking racks 110. The cooking racks 110, each containing one or more individual cooking units 210, are transferred to the distribution module 112 where they are loaded onto delivery vehicles 240. While in transit to each of a number of consumer delivery locations, the cooking conditions within each of the cooking units 210 are adjusted to complete the cooking process shortly before delivery of the food items 204 to the consumer.

Referring now to FIGS. 2A and 2B, the controller 102 receives data indicative of one or more food item orders received by the order entry module 104. The controller 102 communicates the food item orders to the production module 106. Within the production module 106 various ingredients and food products are combined, mixed, or assembled 202 to provide a food item 204 per the order data received from the controller 102. As discussed above, in some instances the order data may be generated by the controller 102 either as a result of an actual received order or based on the occurrence of one or more events that are logically associated with the historical receipt of specific food item orders. The prepared or assembled food items 204 are placed into individual cooking units 210, for example prepared pizzas may be placed into individual ovens 210 for baking. In at least some instances, each of the food items 204 may be prepared on a cleaned and sanitized food preparation surface 206 that can be separated and removed from the cooking unit 210. Such food preparation surfaces may include surfaces that are commonly associated with the cooking of a particular food item. For example, a pizza may be placed on a cleaned and sanitized hearthstone food preparation surface 206 while a hamburger may be placed on a cleaned and sanitized grilling food preparation surface 206.

Each of the cooking units 210 includes a housing 212 disposed at least partially about an interior cavity 214 formed by one or more surfaces 220. Food items are cooked under defined cooking conditions within the interior cavity 214. A hinged or otherwise displaceable door 216 is used to isolate the interior cavity 214 from the external environment. In at least some instances, the door 216 may be mechanically or electro-mechanically held closed while the cooking process is underway. The cooking unit 210 can include a heat source or heat element 218 that is used to provide heat to the interior cavity 214. In addition to the heat source or heating element 218, additional elements such as convection fan(s), humidifiers, gas burners, or similar (not shown in FIGS. 2A and 2B for clarity) may be installed in place of or along with the heat source or heat element 218 in the cooking unit 210.

Each cooking unit 210 can include one or more indicators or display panels 222 that provide information about and/or the cook status of the food item in the respective cooking unit 210. In some instances the display panel 222 may include a text display that provides information such as the type of food item 204 in the cooking unit 210; consumer name and location information associated with the food item 204 in the cooking unit 210; the cook status of the food item 204 in the cooking unit 210 (e.g., "DONE," "COMPLETE," "2 MIN REMAINING"); or combinations thereof. In other instances, the display panel 222 may include one or more indicators that provide the cook status of the food item 204 in the cooking unit 210 (e.g., GREEN="DONE;" YELLOW="<5 MIN REMAINING;" RED=">5 MIN REMAINING"). The data provided to the display 222 may be provided by the controller 102, the routing module 116, the cooking module 118, or any combination thereof. In at least some instances, the display 222 can include a controller capable of independently controlling the cooking conditions within its respective cooking unit 210. In such instances, information indicative of the cooking conditions for the cooking unit 210 may be provided to the display 222 in the form of any number of setpoints or other similar control parametric data by the controller 102, the cooking module 118, or any combination thereof.

One or more power interfaces 224 may be disposed in, on, or about each of the cooking units 210. The power interface 224 is used to provide at least a portion of the power to the cooking unit 210. Such power may be in the form of electrical power generated by the delivery vehicle 240 or by a generator installed on the delivery vehicle 240. Such power may be in the form of a combustible gas (e.g., hydrogen, propane, compressed natural gas, liquefied natural gas) supplied from a combustible gas reservoir carried by the delivery vehicle. In some instances, two or more power interfaces 224 may be installed, for example one electrical power interface 224a supplying power to the display 222 and a convection fan and one combustible gas power interface 224 supplying energy to the heating element 218 may be included on a single cooking unit 210.

One or more power distribution devices 234 can be located in each cooking rack 110 such that the corresponding cooking unit power interface 224 is physically and/or electrically coupled to the appropriate power distribution device 234 when the cooking unit 210 is placed in the cooking rack 110. The power distribution devices 234 can include an electrical bus for distributing electrical power to some or all of the cooking units inserted into the cooking rack 110. The power distribution devices 234 can include a gas distribution header or manifold for distributing a combustible gas to some or all of the cooking units inserted into the cooking rack 110. In at least some instances, the power distribution devices may include one or more quick connect or similar devices to physically and/or electrically couple the power distribution devices 234 to the appropriate power distribution system (e.g., electrical, combustible gas, or other) onboard the delivery vehicle 240.

One or more communications interfaces 226 may be disposed in, on, or about each of the cooking units 210. The communications interface 226 is used to bidirectionally communicate at least data indicative of the cooking conditions existent within the respective cooking unit 210. The communications interface 226 can include a wireless communications interface, a wired communications interface, or any combination thereof. Some or all of the power to operate the communications interface 226 can be provided by the power interface 224. In at least some instances, the communications interface 226 can provide bidirectional wireless communication with a central controller 102. In at least some instances, the communications interface 226 can provide bidirectional wired or wireless communication with a vehicle mounted system such as the routing module 116 or the cooking module 118. Instructions including data indicative of the cooking conditions within the cooking unit 210 can be communicated to the display 222 via the communications interfaces 226. In at least some implementations such instructions may include one or more cooking parameters (e.g., oven temperature=425° F., air flow=HIGH, humidity=65%, pressure=1 ATM) and/or one or more system parameters (e.g., set flame size=LOW) associated with completing or finishing the cooking of the food item in the respective cooking unit 210 based on an estimated time of arrival at the consumer destination location. Such cooking parameters may be determined at least in part by the cooking module 118 based on estimated time of arrival information provided by the routing module 116.

One or more wired or wireless communications buses 236 can be located in each cooking rack such that the corresponding cooking unit communications interface 224 is communicably coupled to the communications bus 236 when the cooking unit 210 is placed in the cooking rack 110. In at least some instances, the communications buses 236 may be wiredly or wirelessly communicably coupled to the controller 102, the routing module 116, the cooking module 118 or any combination thereof.

Each of the cooking racks 110 can accommodate the insertion of any number of cooking units 210. The cooking conditions within each of the cooking units 210 inserted into a common cooking rack 110 can be individually adjusted to control the completion time of the particular food item within the cooking unit 210. Although the cooking rack may accommodate the insertion of multiple cooking units 210, the cooking rack 110 need not be completely filled with cooking units 210 during operation. In at least some implementations, each of the cooking racks 110 may be equipped with any number of moving devices 236 to facilitate the movement of the cooking rack 110. Such moving devices 236 can take any form including rollers, casters, wheels, and the like.

Referring now to FIGS. 2A and 2C, the cooking rack 110 containing any number of cooking units 210 is shown loaded into the cargo compartment 241 of a delivery vehicle 240. The cooking rack 110 is shown communicably coupled 238 to a cooking module 118 onboard the delivery vehicle 240. The cooking rack 110 is also shown physically and operationally coupled 258 to a power source 260 onboard the delivery vehicle 240. The power source 260 supplies power to the various cooking units 210 in the cooking rack 110 via the power bus 234. The cooking module 118 provides via the communications bus 236 the data and other information indicative of instructions used to control the cooking conditions in each of the cooking units 210 in the cooking rack 110. Although shown as discrete functional elements onboard the delivery vehicle 240, either or both the routing module 116 and the cooking module 118 may be disposed remote from the delivery vehicle 240. For example, the controller 102 may provide some or all of the functionality associated with either or both the routing module 116 and the cooking module 118.

In at least some instances, the routing module 116 and/or the controller 102 can be bidirectionally communicably coupled 248 to a display device 250 located in the delivery vehicle 240. The display device 250 can provide the driver of the delivery vehicle 240 with routing information 252 in the form of text directions, voice instructions, or a map. In addition, the display device 250 can also provide the driver of the delivery vehicle 240 with a delivery itinerary 254 that lists a number of consumer delivery destinations and provides a local estimated time of arrival at each respective consumer delivery destination. The routing information 252 and the delivery itinerary 254 can be determined in whole or in part by the routing module 116, the controller 102, or any combination thereof.

In some instances, data indicative of the remaining cooking time for one or more cooking units 210 may be provided to the routing module 116 by the cooking module 118. Such remaining cooking time data may be used by the routing module 116 to determine, at least in part, the delivery itinerary 254 and the available cooking times for each of the cooking units 210. For example, if a special food item will require a minimum of 20 minutes to cook in its cooking unit 210 and the consumer destination is the geographically closest location to the delivery vehicle 240, the routing module 116 can autonomously prepare an alternate delivery itinerary 254 in which food items 204 are delivered to other consumer locations prior to delivering the special food item to the consumer location in about 20 minutes.

Advantageously, by providing the driver of the delivery vehicle 240 with routing information 252 and a delivery itinerary 254, the available cooking time for the food item in each respective cooking unit 210 can be determined by the controller 102, the routing module 116, the cooking module 118, or combinations thereof. For example, if the current time is 7:02 PM and the routing to the third consumer on the delivery itinerary 254 indicates a delivery time of 7:44 PM, the available cooking time is 42 minutes for those food items associated with the third consumer on the delivery itinerary 254. The available cooking time for each respective cooking unit 210 in the cargo compartment 241 of the delivery vehicle 240 may be similarly determined by the controller 102, the routing module 116, the cooking module 118, or combinations thereof.

The controller 102 and/or the cooking module 118 can establish, control, or adjust cooking conditions in each of the cooking units 210 based at least in part on the available cooking time. Such cooking conditions may be determined by the controller 102, the cooking module 118, or some combination thereof, such that food items are advantageously delivered to the consumer destination location shortly after cooking has completed. In at least some instances real time updating, for example to reflect traffic conditions between the current location of the delivery vehicle 240 and the consumer destination may cause the controller 102 and/or routing module 116 to autonomously dynamically update the delivery itinerary 254. New available cooking times for each consumer destination location can be determined by the controller 102, routing module 116, the cooking module 118, or any combination thereof, based on the updated delivery itinerary 254. Cooking conditions in each of the cooking units 210 can be adjusted throughout the delivery process to reflect the newly estimated times of arrival using the dynamically updated delivery itinerary 254. The routing module 116 provides the updated delivery itinerary 254 and the recalculated available cooking times to the cooking module 118. In at least some instances, data indicative of the location of the delivery vehicle 240 and the estimated delivery time may be provided to the consumer via SMS messaging, web portal access, or any other means of communication.

Once the cooking of a food item 204 is completed, the cooking unit 210 containing the respective food item 204 is turned off and the food item is transferred to a package or transport container 242 such as a box, carton, bag, or similar device for transport to the consumer. In at least some instances, packages or transport containers 242 may be readied or pre-staged to accept food items from each of the cooking units 210. For example, a transport container rack 243 containing a number of packages or transport containers 242 can be positioned adjacent or proximate the rack 110 containing the cooking units 210 in the cargo compartment 241 of the delivery vehicle 240.

In at least some implementations, the transfer of the food item 204 from the cooking unit 210 to the transport container 242 is advantageously autonomously performed, for example through the use of a conveyance or actuator 246 that physically transfers the food item 204 from the cooking unit 210 to the transport container 242. Such actuators 246 can be adapted to a particular type of cooking unit 210. Thus, for example, an actuated paddle 246 may be used to displace pizzas from a cooking unit 210 to a transport container 242, while an actuated pusher blade may be used to displace hamburgers from a grill type cooking unit to a transport container 242. Other actuators 246 tailored to specific cooking unit and food item types may also be used.

After the food item 204 is placed in the transport container 242, the transport container is closed 244 and prepared for delivery to the consumer. Beneficially, the cooking and loading of the food item 204 into the package or transport container 242 is performed autonomously, without human intervention. Thus, subject to local and state regulation, such automated cooking and delivery systems may subject the operator to fewer or less rigorous health inspections than other systems requiring human intervention. For instance, the delivery vehicle may not be required to have all of the same equipment as a standard food preparation area (e.g., adequate hand washing facility). Also for instance, delivery personnel may not be subject to the same regulations as food preparers (e.g., having training, passing testing, possessing a food workers' certificate or card). More beneficially, by cooking and packaging the food items 204 in the delivery vehicle 240, a higher quality food product may be provided to the consumer.

Figure 3:
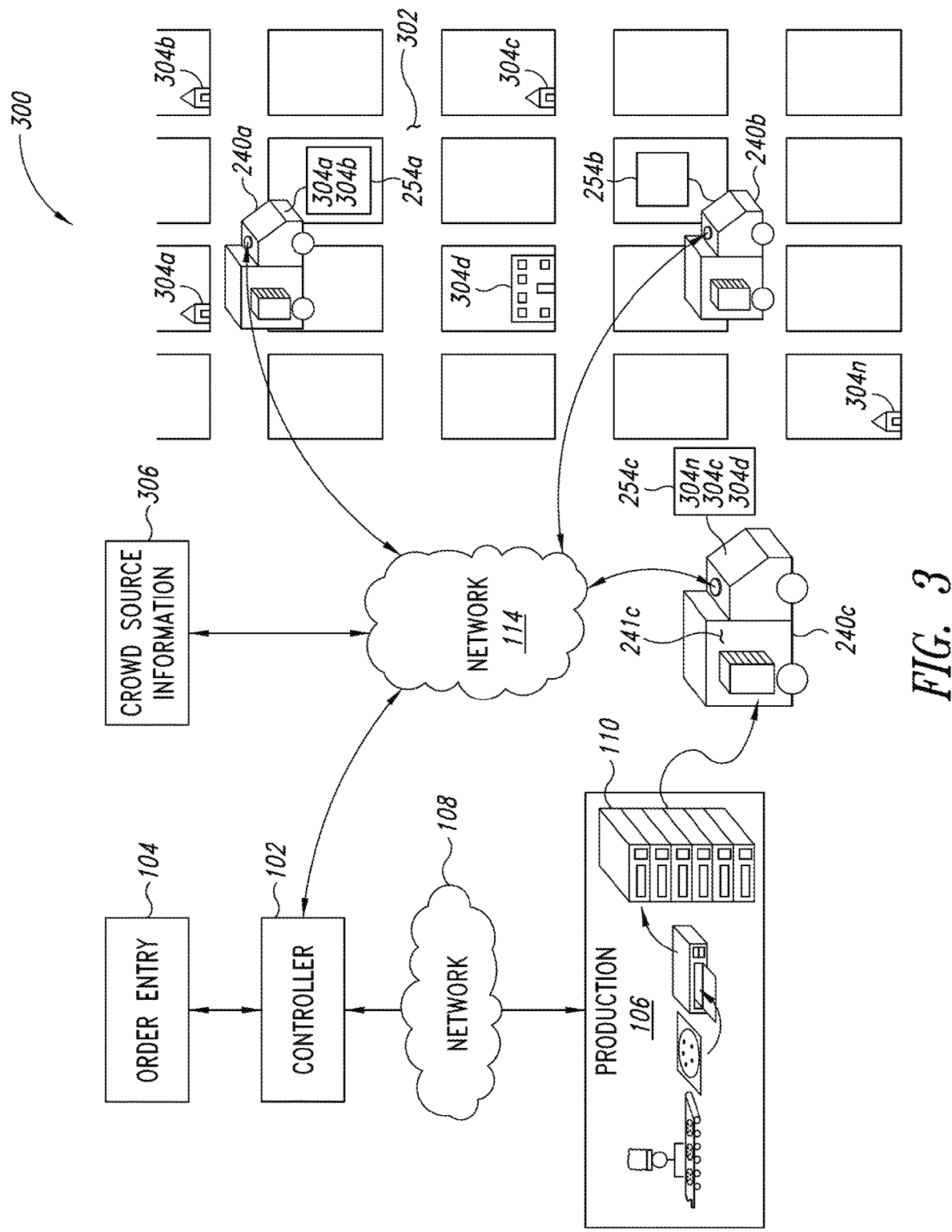
FIG. 3 is a schematic diagram of a food delivery system that includes a centralized production module and central controller along with a number of delivery vehicles in which food is prepared under controlled conditions while enroute to a number of consumer destinations distributed across a geographic area using a delivery itinerary, according to one illustrated embodiment.

FIG. 3 shows a schematic diagram of a food delivery system 300 that includes a centralized production module 106 and controller 102 along with a number of delivery vehicles 240*a*-240*n* in which food items are prepared in a number of cooking units 210 while enroute to a number of consumer delivery destinations 304*a*-304*n* (collectively "consumer delivery destinations 304") distributed across a geographic area 302. The delivery driver in each of the delivery vehicles 240 can follow their respective routing instructions 252 and the delivery itinerary 254 provided by the controller 102 and/or routing module 116.

In at least some instances, the routing instructions 252 and delivery itinerary 254 may be dynamically updated or adjusted during the delivery process to reflect the latest traffic, road conditions, road closures, etc. Such traffic, road condition, and road closure information may be obtained via one or more of: a commercial source of traffic information, crowd-sourced traffic information 306, or some combination thereof. By dynamically updating traffic information, the controller 102 and/or routing modules 116 in each of the delivery vehicles 240 can provide up-to-the-minute routing instructions 252 and delivery itineraries 254. By dynamically updating traffic information, the controller 102 and/or cooking modules 116 in each of the delivery vehicles 240 can dynamically adjust the cooking conditions within each of the cooking units carried by each delivery vehicle 240 to reflect the available cooking time for each of the respective cooking units 210.

In at least some instances, the controller 102 can dynamically load balance the delivery itineraries 254*a* and 254*b* for at least two of the delivery vehicles 240*a* and 240*b*, respectively. Such dynamic load balancing may for example, result in the delivery of a food item 204 loaded on delivery vehicle 240*b* to a consumer delivery destination 304 originally scheduled for delivery by delivery vehicle 240*a*. Such dynamic load balancing mitigates the impact of unforeseen, unexpected, or unavoidable delays (e.g., accident, congestion, etc.) in the travel of of delivery vehicle 240*a* to one or more consumer delivery destinations 304 on delivery itinerary 254*a*. Such dynamic load balancing may be autonomously performed by the controller 102, the routing module 116, the cooking module, or combinations thereof.

Prior to arriving at the consumer delivery destination 304, the driver of the delivery vehicle 240 may be provided with data indicative of consumer information such as the consumer's name and order history that is associated with a particular consumer delivery destination 304. Such consumer information data may be communicated from the controller 102 to the display device 250 in the delivery vehicle 240. Such consumer information, including consumer order history information may be used to select various promotional offers and/or benefits to reward frequent patrons or to encourage new patrons to order additional food items. Additionally, the provision of consumer information to the delivery driver can advantageously permit the delivery driver to personalize the delivery process for each consumer destination location 304.

Historical order information may be used to predict orders from one or more particular consumer delivery destinations 304. For example, historically, a large number of particular food items (e.g., pepperoni pizzas) can be logically associated with a particular consumer delivery destination (e.g., a college campus) and a temporal interval (e.g., between 6:00 PM and 9:00 PM on weekend nights) or an external event (e.g., when an athletic event is in progress on the college campus). Such information may permit predictive order generation by the controller 102. For example, by anticipating a future demand for a particular item in a geographic region or at a particular consumer delivery address, the controller 102 can autonomously generate orders that cause the preparation of particular food items by the production module 106. The prepared food items 204, without yet having received an order from a particular consumer, are loaded into a delivery vehicle 240 that is routed by the routing module 116 to the geographic area 302 in which orders for those food items 204 are anticipated. Once the orders are received at the order entry module 104, the controller 102 can route the delivery vehicle 240 to the exact consumer delivery destination 304. Such a predictive order generation by the controller 102 can reduce delivery times even further. Reduced delivery times for freshly cooked food can advantageously provide potentially significant market differentiation.

Figure 4:
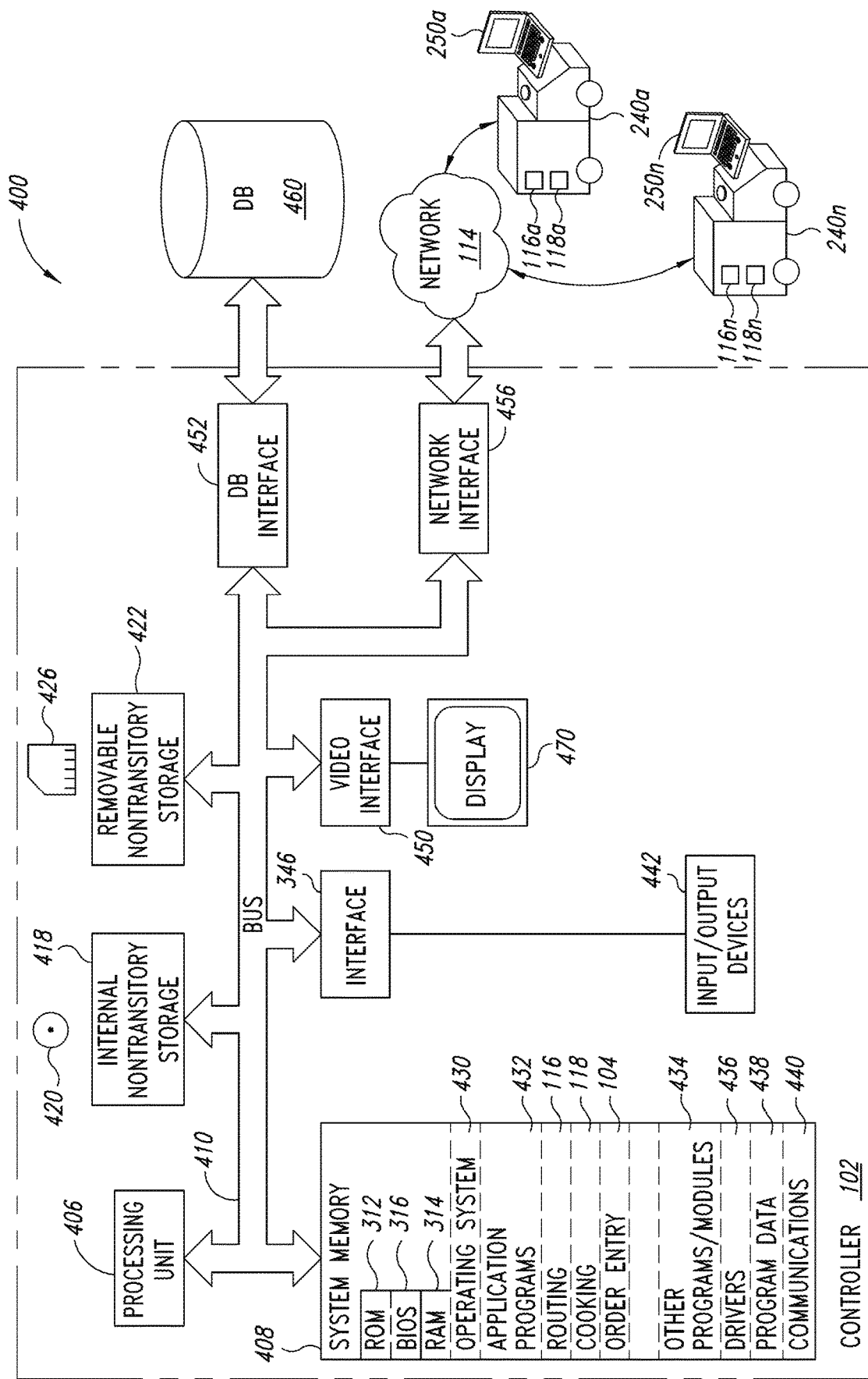
FIG. 4 is a block diagram of a food delivery system controller, according to one or more illustrated embodiments.

FIG. 4 and the following discussion provide a brief, general description of an exemplary central controller 102 that may be used to provide the controller 102. Although the order entry module 104, the routing module 116, and the cooking module 118 are described herein as functional elements of a central controller 102, one of ordinary skill in the art would readily appreciate that some or all of the functionality of the order entry module 104, routing module 116, or the cooking module 118 may be performed using one or more additional computing devices which may be external to the controller 102. For example, an order entry module 104 may be disposed in a national or regional call or order aggregation center that is remote from the controller 102. In another example, the routing module 116, and/or the cooking module 118 may be disposed in some or all of the delivery vehicles 240. The controller 102 may implement some or all of the various functions and operations discussed immediately above in reference to FIGS. 1, 2, and 3.

Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system configurations, including handheld devices for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be stored in both local and remote memory storage devices and executed using one or more local or remote processors, microprocessors, digital signal processors, controllers, or combinations thereof.

The controller 102 may take the form of any current or future developed computing system capable of executing one or more instruction sets. The controller 102 includes a processing unit 406, a system memory 408 and a system bus 410 that communicably couples various system components including the system memory 408 to the processing unit 406. The controller 102 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

The processing unit 406 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 4 are of conventional design. As a result, such blocks need not be described in further detail herein, as they will be understood by those skilled in the relevant art.

The system bus 410 can employ any known bus structures or architectures, including a memory bus with memory controller, a peripheral bus, and a local bus. The system memory 408 includes read-only memory ("ROM") 412 and random access memory ("RAM") 414. A basic input/output system ("BIOS") 416, which can form part of the ROM 412, contains basic routines that help transfer information between elements within the controller 102, such as during start-up. Some embodiments may employ separate buses for data, instructions and power.

The controller 102 also includes one or more internal nontransitory storage systems 418. Such internal nontransitory storage systems 418 may include, but are not limited to, any current or future developed persistent storage device 420. Such persistent storage devices 420 may include, without limitation, magnetic storage devices such as hard disc drives, electromagnetic storage devices such as memristors, molecular storage devices, quantum storage devices, electrostatic storage devices such as solid state drives, and the like.

The controller 102 may also include one or more optional removable nontransitory storage systems 422. Such removable nontransitory storage systems 422 may include, but are not limited to, any current or future developed removable persistent storage device 426. Such removable persistent storage devices 326 may include, without limitation, magnetic storage devices, electromagnetic storage devices such as memristors, molecular storage devices, quantum storage devices, and electrostatic storage devices such as secure digital ("SD") drives, USB drives, memory sticks, or the like.

The one or more internal nontransitory storage systems 418 and the one or more optional removable nontransitory storage systems 422 communicate with the processing unit 406 via the system bus 410. The one or more internal nontransitory storage systems 418 and the one or more optional removable nontransitory storage systems 422 may include interfaces or device controllers (not shown) communicably coupled between nontransitory storage system and the system bus 410, as is known by those skilled in the relevant art. The nontransitory storage systems 418, 422, and their associated storage devices 420, 426 provide nonvolatile storage of computer-readable instructions, data structures, program modules and other data for the controller 102. Those skilled in the relevant art will appreciate that other types of storage devices may be employed to store digital data accessible by a computer, such as magnetic cassettes, flash memory cards, Bernoulli cartridges, RAMs, ROMs, smart cards, etc.

Program modules can be stored in the system memory 408, such as an operating system 430, one or more application programs 432, other programs or modules 434, drivers 436 and program data 438.

The application programs 432 may include, for example, one or more machine executable instruction sets capable of providing an order entry module 104 able to receive food item orders in any form of communication, including without limitation, voice orders, text orders, and digital data orders. The application programs 432 may additionally include one or more machine executable instruction sets capable of providing a routing module 116 able to provide text, voice, and/or graphical routing instructions to the output devices 250 in some or all of the delivery vehicles 240. Such a routing module machine executable instruction set may also be executable by one or more controllers in a routing module 116 installed in some or all of the delivery vehicles 240. The application programs 432 may further include one or more cooking module machine executable instructions sets capable of outputting cooking instructions to the cooking units 210 in the cargo compartment 241 of each delivery vehicle 240.

Such cooking instructions can be determined by the controller 102 using any number of inputs including at least, the food type in a particular cooking unit 210 and the available cooking time before each respective food item 204 is delivered to a consumer destination location 304. Such a cooking module machine executable instruction set may be executed in whole or in part by one or more controllers in the cooking module 118 installed in some or all of the delivery vehicles 240. In at least some instances, the routing module 116 and/or the cooking module 118 may provide a backup controller in the event controller 102 becomes communicably decoupled from the delivery vehicle 240. In another implementation, the routing module 116 and/or the cooking module 118 installed in each delivery vehicle may include nontransitory storage to store routing and delivery itinerary data and cooking data communicated to the respective module by the controller 102. The application programs 432 may, for example, be stored as one or more executable instructions.

The system memory 408 may also include other programs/modules 434, such as including logic for calibrating and/or otherwise training various aspects of the controller 102. The other programs/modules 434 may additionally include various other logic for performing various other operations and/or tasks.

The system memory 408 may also include any number of communications programs 440 to permit the controller 102 to access and exchange data with other systems or components, such as with the routing modules 116, cooking modules 118, and/or output devices 250 installed in each of the delivery vehicles 240.

While shown in FIG. 4 as being stored in the system memory 408, all or a portion of the operating system 430, application programs 432, other programs/modules 434, drivers 436, program data 438 and communications 440 can be stored on the persistent storage device 420 of the one or more internal nontransitory storage systems 418 or the removable persistent storage device 426 of the one or more optional removable nontransitory storage systems 422.

A user can enter commands and information into the controller 102 using one or more input/output (I/O) devices 442. Such I/O devices 442 may include any current or future developed input device capable of transforming a user action or a received input signal to a digital input. Example input devices include, but are not limited to, a touchscreen, a physical or virtual keyboard, a microphone, a pointing device, or the like. These and other input devices are connected to the processing unit 406 through an interface 446 such as a universal serial bus ("USB") interface communicably coupled to the system bus 410, although other interfaces such as a parallel port, a game port or a wireless interface or a serial port may be used. A display 470 or similar output device is communicably coupled to the system bus 410 via a video interface 450, such as a video adapter or graphical processing unit ("GPU").

In some embodiments, the controller 102 operates in an environment using one or more of the network interfaces 456 to optionally communicably couple to one or more remote computers, servers, display devices 250 and/or other devices via one or more communications channels, for example, one or more networks such as the network 114. These logical connections may facilitate any known method of permitting computers to communicate, such as through one or more LANs and/or WANs. Such networking environments are well known in wired and wireless enterprise-wide computer networks, intranets, extranets, and the Internet.

Further, the database interface 452, which is communicably coupled to the system bus 410, may be used for establishing communications with a database stored on one or more computer-readable media 460. For example, such a database 460 may include a repository for storing information regarding food item cooking conditions as a function of time, etc.

Description of Delivery System Methods

Figure 5:
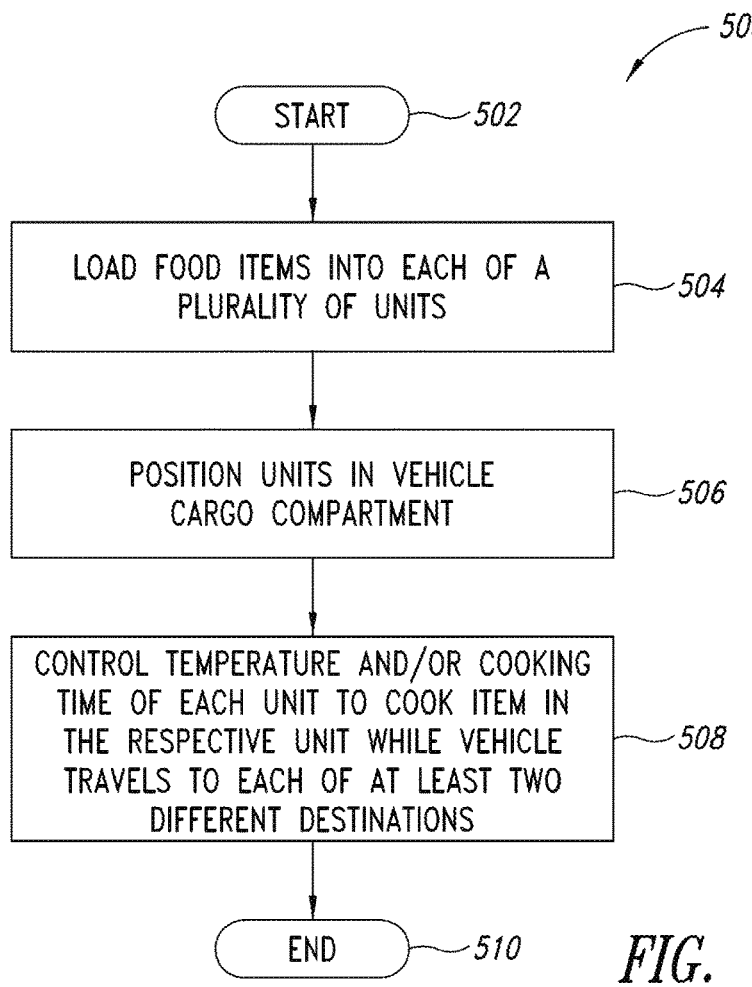
FIG. 5 is a high level logic flow diagram of an example food delivery system, according to an illustrated embodiment.

FIG. 5 shows a high level logic diagram 500 for an example delivery system such as the system 100 depicted in FIG. 1 for food items 204 that are cooked while enroute to a customer destination location 304. Such a system 100 advantageously and beneficially reduces the delivery time for food orders 204 over more traditional delivery systems where the food items are fully cooked prior to delivery. Such a system 100 also advantageously and beneficially provides for the delivery of fresher food items to the consumer (i.e., items that are "fresh from the oven" or "fresh from the grill"). Orders for food items 204 are received at an order input module 104 that, in turn, communicates data indicative of the received food item order and a logically associated consumer delivery destination to the production module 106. The food items 204 are prepared or assembled in the production module 106 in accordance with each respective consumer's order. The method 500 commences at 502.

At 504, the prepared food items 204 are loaded into cooking units 210, a number of which may be optionally loaded into cooking racks 110. The food item 204 is logically associated with the cooking unit 210 and the consumer delivery destination 304. By logically associating the food item 204 with both the cooking unit 210 and the consumer delivery destination 304, the cooking module 118 can adjust the cooking conditions within the cooking unit 210 to complete the cooking process shortly before arrival of the delivery vehicle 240 at the consumer delivery destination location 304.

At 506, the cooking units 210 are positioned and secured in the cargo compartment 241 of the delivery vehicle 240 and coupled to the power distribution device 234 such as an electrical circuit or a combustible gas supply. The cooking units are further wirelessly or wiredly communicably coupled to a communications interface 236. In some instances, the cooking units 210 can be loaded into a cooking rack 110 which contains a power distribution device 234 and a wired or wireless communications bus or interface 236. The communications bus or interface 236 can provide data or instructions that alter, adjust, or control the cooking conditions in each individual cooking unit 210. Such cooking condition data or instructions are generated by the controller 102 and/or the cooking module 118.

At 508, the cooking module 118 can control or otherwise adjust the cooking conditions in at least two cooking units 210 such that the cooking process for the food item 204 in each respective cooking unit 210 is completed while the delivery vehicle 240 is in route to the consumer delivery destination 304 logically associated with each respective food item 204. The method concludes at 510.

Figure 6:
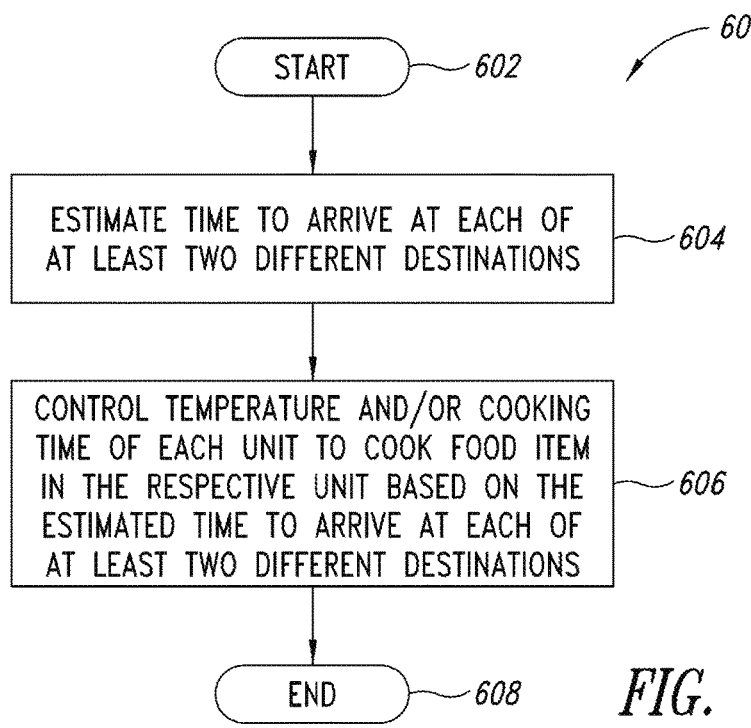
FIG. 6 is a logic flow diagram of an example food delivery system that includes controlling the cooking conditions of multiple food cooking units based at least in part on the expected time to arrive at each delivery location, according to an illustrated embodiment.

FIG. 6 shows a high level logic diagram 600 for an example delivery system for food items 204 that are cooked while in route to at least two different customer destination locations 304. Such a system 100 advantageously and beneficially reduces the delivery time for food orders over more traditional delivery systems where the food items are fully cooked at a central facility prior to delivery. Such a system 100 also advantageously and beneficially provides for the delivery of fresher food items to the consumer (i.e., items "fresh from the oven" or "fresh from the grill"). Orders for food items 204 are received at an order input module 104 that, in turn, communicates data indicative of the received food item order and a logically associated consumer delivery destination to the production module 106. The food items 204 are prepared or assembled in the production module 106 in accordance with each respective consumer's order. The method 600 commences at 602.

At 604, the controller 102, the routing module 116, the cooking module 118, or any combination thereof determines the estimated time to arrive at the two different consumer destination locations 304. The available cooking time to prepare the food items 204 for delivery to each of the respective consumer delivery destinations 304 is determined based at least in part on the current local time and the estimated time of arrival of the delivery vehicle 204 at each consumer destination location 304. The estimated time of arrival of the delivery vehicle at each consumer destination location 304 can be determined by the controller 102 and/or the routing module 116 based at least in part on the dynamically updated delivery itinerary 254.

At 606, the controller 102 and/or the cooking module 118 can communicate data or instructions indicative of cooking conditions to the cooking units 210 logically associated with the two different consumer delivery destinations 304. In at least some instances, such cooking conditions can include a temperature and/or a cooking time for each of the cooking units 210. In at least some instances the cooking time for each of the cooking units 210 can be set by the controller 102 and/or cooking module 118 as less than or equal to the available cooking time determined using the estimated time of arrival of the delivery vehicle 240 at the consumer delivery destination 304. The method 600 concludes at 608.

Figure 7:
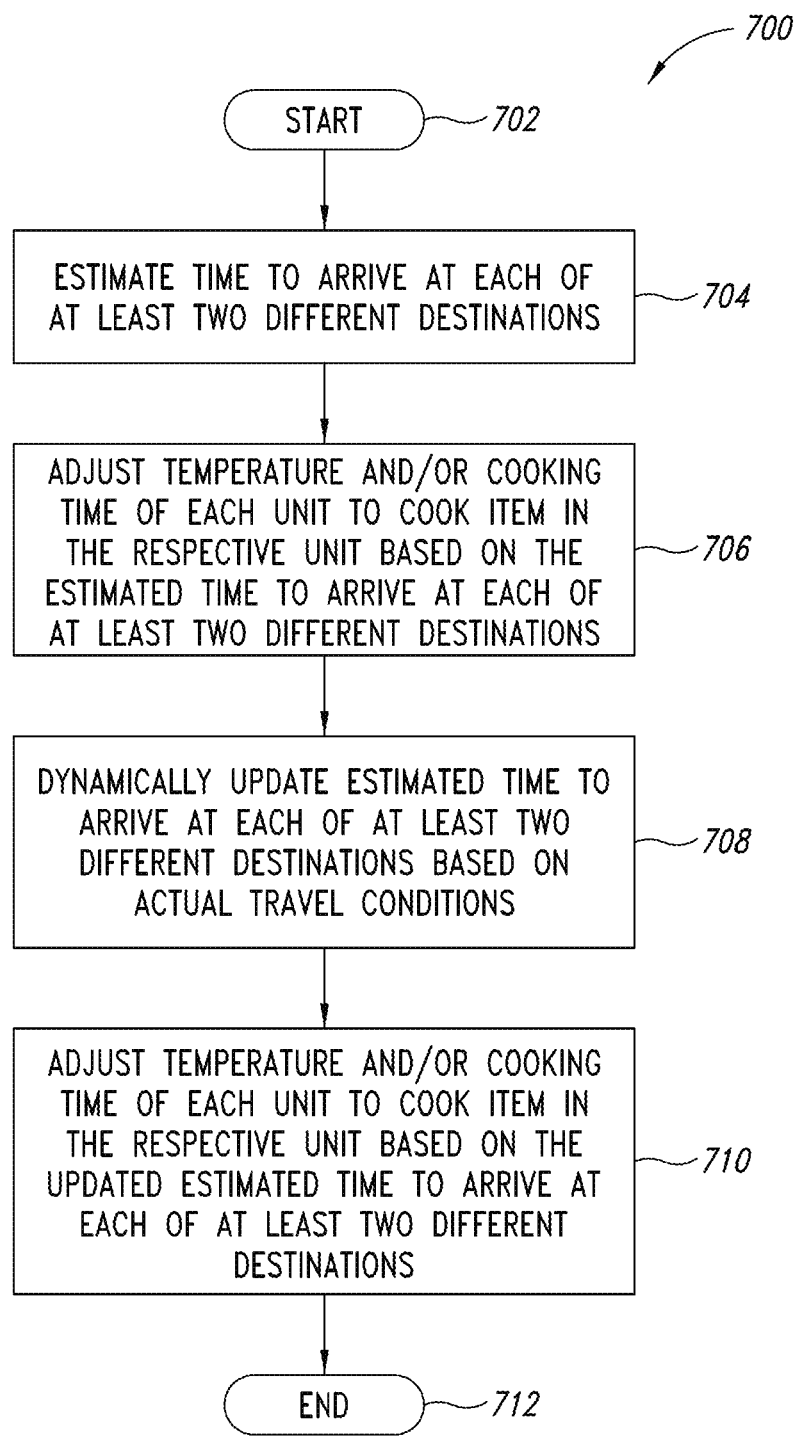
FIG. 7 is a logic flow diagram of an example food delivery system that includes dynamic adjustment of cooking conditions in multiple food cooking units based at least in part on updated times of arrival at various delivery locations, according to an illustrated embodiment.

FIG. 7 shows a high level logic diagram 700 for an example delivery system for food items 204 that are cooked while enroute to at least two different customer destination locations 304 using dynamically updated cooking conditions. Such a system 100 advantageously and beneficially reduces the delivery time for food orders over more traditional delivery systems where the food items are fully cooked at a central facility prior to delivery. Such a system 100 also advantageously and beneficially provides for the delivery of fresher food items to the consumer (i.e., items "fresh from the oven" or "fresh from the grill"). Orders for food items 204 are received at an order input module 104 that, in turn, communicates data indicative of the received food item order and a logically associated consumer delivery destination to the production module 106. The food items 204 are prepared or assembled in the production module 106 in accordance with each respective consumer's order. The method 700 commences at 702.

At 704, the controller 102, the routing module 116, the cooking module 118, or any combination thereof determines the estimated time to arrive at the two different consumer destination locations 304. The available cooking time to prepare the food items 204 for delivery to each of the respective consumer delivery destinations 304 can be determined using the current local time and the estimated time of arrival of the delivery vehicle at each consumer destination location 304.

At 706, the controller 102, the cooking module 118, or any combination thereof can send data or instructions indicative of cooking conditions to the cooking units 210 logically associated with the two different consumer delivery destinations 304. In at least some instances, such cooking conditions can include a temperature and/or a cooking time for each of the cooking units 210. In at least some instances the cooking time for each of the cooking units 210 can be based in whole or in part on the available cooking time determined using the estimated time of arrival of the delivery vehicle 240 at the consumer delivery destination 304.

At 708, the estimated time of arrival at each of two different consumer delivery destinations 304 can be dynamically updated to reflect traffic, congestion, and other factors that would delay the delivery of the food items 204 to at least one of the customer delivery destinations 304. The updated times of arrival at each of the consumer delivery destinations 304 can be determined by the controller 102, the routing module 116, or any combination thereof. The available cooking time for each of the food items 204 delivered to each of the at least two consumer delivery locations 304 can be determined by the controller 102, the routing module 116, or any combination thereof.

At 710, the controller 102 and/or cooking module 118 generates data or instructions to cause the adjustment or alteration of cooking conditions in at least one of the cooking units 210 to reflect the available cooking time determined at 708. The method 600 concludes at 608.

Figure 8:
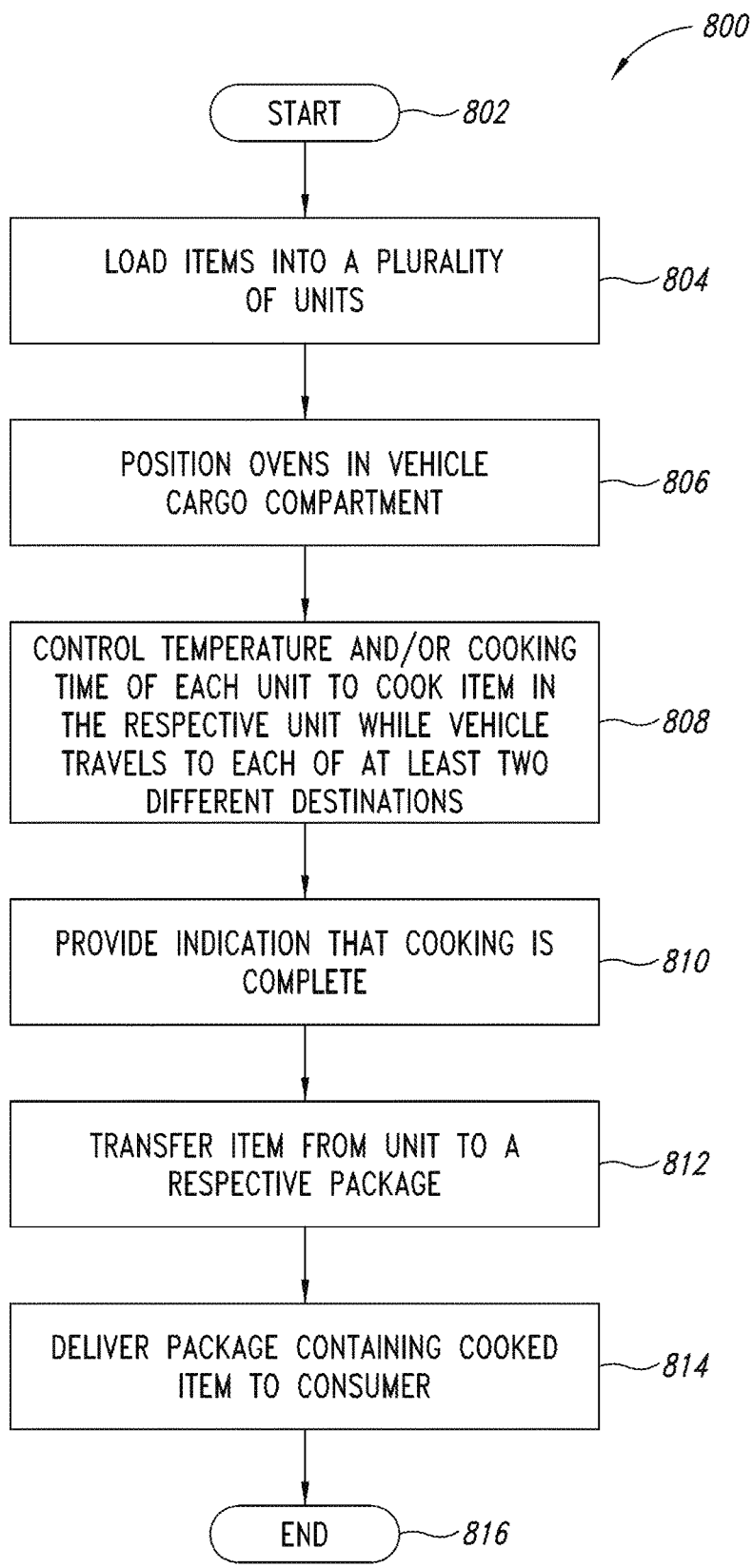
FIG. 8 is a logic flow diagram of an example food delivery system that includes the cooking conditions of multiple food cooking units based at least in part on the expected time to arrive at each delivery location and the automated loading of food into a transport container for delivery, according to an illustrated embodiment.

FIG. 8 shows a high level logic diagram 800 for an example delivery system such as the system 100 depicted in FIG. 1 for food items 204 that are cooked while in route to a customer destination location 304. Such a system 100 advantageously and beneficially reduces the delivery time for food orders over more traditional delivery systems where the food items are fully cooked prior to delivery. Such a system 100 also advantageously and beneficially provides for the delivery of fresher food items (i.e., items "fresh from the oven" or "fresh from the grill" to the consumer. Such a system 100 also advantageously and beneficially provides for the delivery of fresher food items to the consumer (i.e., items "fresh from the oven" or "fresh from the grill"). Orders for food items 204 are received at an order input module 104 that, in turn, communicates data indicative of the received food item order and a logically associated consumer delivery destination to the production module 106. The food items 204 are prepared or assembled in the production module 106 in accordance with each respective consumer's order. The method 800 commences at 802.

At 804, the prepared food items 204 are loaded into cooking units 210. A number of the cooking units 210 may optionally be loaded into cooking racks 110. The food item 204 in the cooking unit 210 is logically associated with the respective cooking unit 210 and a consumer delivery destination 304. By logically associating the food item 204 with both the cooking unit 210 and the consumer delivery destination 304, the controller 102 and/or cooking module 118 can adjust the cooking conditions within the cooking unit 210 to complete the cooking process prior to the arrival of the delivery vehicle 240 at the consumer delivery destination location 304.

At 806, the cooking units 210 are positioned and secured in the cargo compartment 241 of the delivery vehicle 240 and coupled to the power distribution device 234 such as an electrical circuit or a combustible gas supply. The cooking units are further wirelessly or wiredly communicably coupled to a communications interface 236. In some instances, the cooking units 210 can be loaded into a cooking rack 110 which contains a power distribution device 234 and a wired or wireless communications bus or interface 236. The communications bus or interface 236 can provide data or instructions that alter, adjust, or control the cooking conditions in each individual cooking unit 210. Such cooking condition data or instructions are generated by the controller 102 and/or the cooking module 118.

At 808, the controller 102 and/or cooking module 118 can generate instructions or data to cause the alteration, adjustment, or control of the cooking conditions in at least two cooking units 210 such that the cooking process for the food item 204 in each respective cooking unit 210 is completed while the delivery vehicle 240 is in route to the consumer delivery destination 304 logically associated with each of the respective food items 204.

At 810, one or more indicators are provided to the delivery driver to indicate the cooking of a food item 204 has completed. In at least some instances, the indicator can be initiated or otherwise controlled by the display device or controller 222 in each respective cooking unit 210. In some instances, the indicator can be initiated or otherwise controlled by the controller 102 and/or cooking module 118. In at least some instances, the indicator may be disposed on an exterior surface of the respective cooking unit 210, for example on the display device 222. In at least some instances, the indicator may be displayed on the display device 250.

At 812, responsive to the receipt of an indicator indicative of the completion of the cooking process for a food item in a cooking unit, the completed food item 204 is autonomously transferred from the cooking unit 210 to a delivery package or transport container 242 for delivery to the consumer.

At 814, the delivery driver can deliver the delivery package or transport container 244 containing the cooked food item 204 to the consumer. The method concludes at 816.

Figure 9:
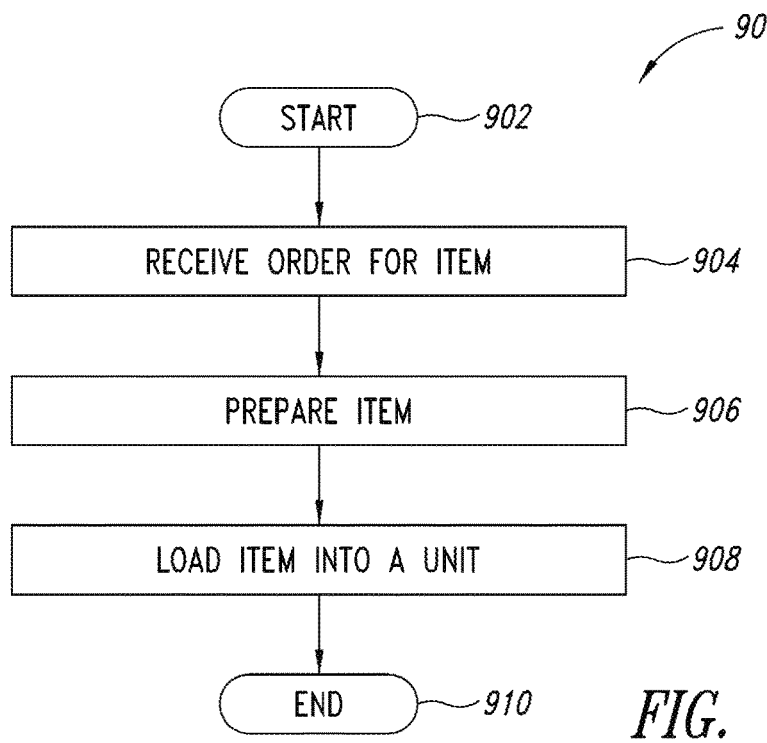
FIG. 9 is a logic flow diagram of an example preparation module in a food delivery system that includes receiving an order for a food item, preparing the item per the received order, and loading the item into a cooking unit such as an oven, according to an illustrated embodiment.

FIG. 9 shows a high level logic diagram 900 for an example order entry module 104 used to generate order entry data for transmission to a controller 102. Prior to the preparation of food items 204 by the production module 106, data indicative of each food item 204 is communicated from the controller 102 to the production module 106. The method commences at 902.

At 904, the controller 102 receives data indicative of one or more food item(s) 204 ordered by a consumer. Such data may include the consumer's name, delivery address, and other information that is logically associated with the one or more food item(s) 204. In turn, the controller 102 communicates data indicative of the one or more food item(s) 204 to the production module 106 where the one or more food item(s) are prepared or assembled.

At 906, the production module 106 produces, assembles or otherwise creates the one or more food item(s) 204. In at least some instances, the production or assembly of the one or more food item(s) 204 can be partially or completely automated, reducing or even eliminating the need for human contact with the ingredients and/or the one or more assembled food item(s) 204.

At 908, the production module loads the one or more assembled food item(s) 204 into any number of cooking units 210. The cooking units 210 may be loaded into a cooking rack 110. A logical association is created between the one or more food item(s) 204, the cooking unit 210 into which the one or more food item(s) 204 are placed, and the consumer delivery destination 304. The data representative of this logical association may be stored in a nontransitory storage in the controller 102, the routing module 116, the cooking module 118, the display device 250, or any combination thereof. The method 900 concludes at 910.

Figure 10:
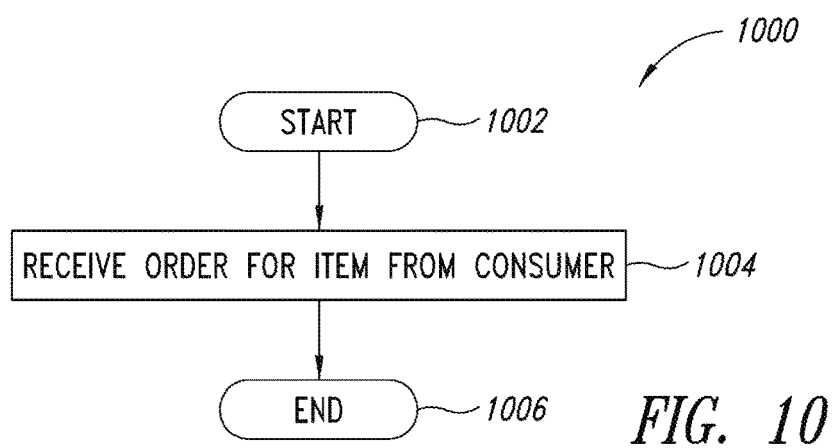
FIG. 10 is a logic flow diagram of an example preparation module in a food delivery system that includes receiving an order for a food item from a consumer, according to an illustrated embodiment.

FIG. 10 shows a high level logic flow diagram 1000 for an example consumer order entry method. Such a consumer order entry method may be used with any of the food delivery methods described with respect to FIGS. 5-9. The method commences at 1002.

At 1004, the order entry module 104 receives an order for one or more food item(s) 204 from a consumer who provides information indicative of a consumer destination 304. In at least some instances, order data including data indicative of at least the ordered food item(s) 204 and the consumer destination 304 is communicated or otherwise provided to the controller 102. The controller 102 establishes a logical association between the ordered food item(s) 204 and the consumer delivery destination 304. The method concludes at 1006.

Figure 11:
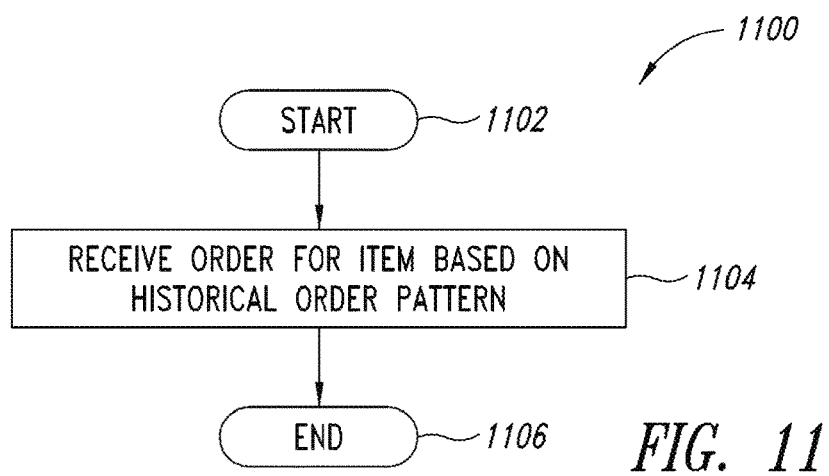
FIG. 11 is a logic flow diagram of an example preparation module in a food delivery system that includes autonomously generating an order for a food item based at least in part on a historical pattern, according to an illustrated embodiment.

FIG. 11 shows a high level logic flow diagram 1100 for an example automated order generation method. Such an automated order generation method may be used with any of the food delivery methods described with respect to FIGS. 5-9. The controller 102 may perform such an automated order generation method responsive to one or more explicit or inferred historical order entry pattern(s). For example, a historical order pattern may be formed when a number of incoming orders for one or more particular food item(s) 204 coincides with a temporal event (e.g., Friday evenings between 6:00 PM and 9:00 PM) or the occurrence of an external event (e.g., a professional sporting event). The method commences at 1102.

At 1104, the controller 102 autonomously generates a number of orders for food items 204 based on a historical order pattern or in anticipation of incoming orders for the food items 204. The controller 102 communicates the generated orders, in the absence of a received order for the food item(s) 204, to the production module 106 where the food items 204 are prepared or assembled. The method concludes at 1106.

Figure 12:
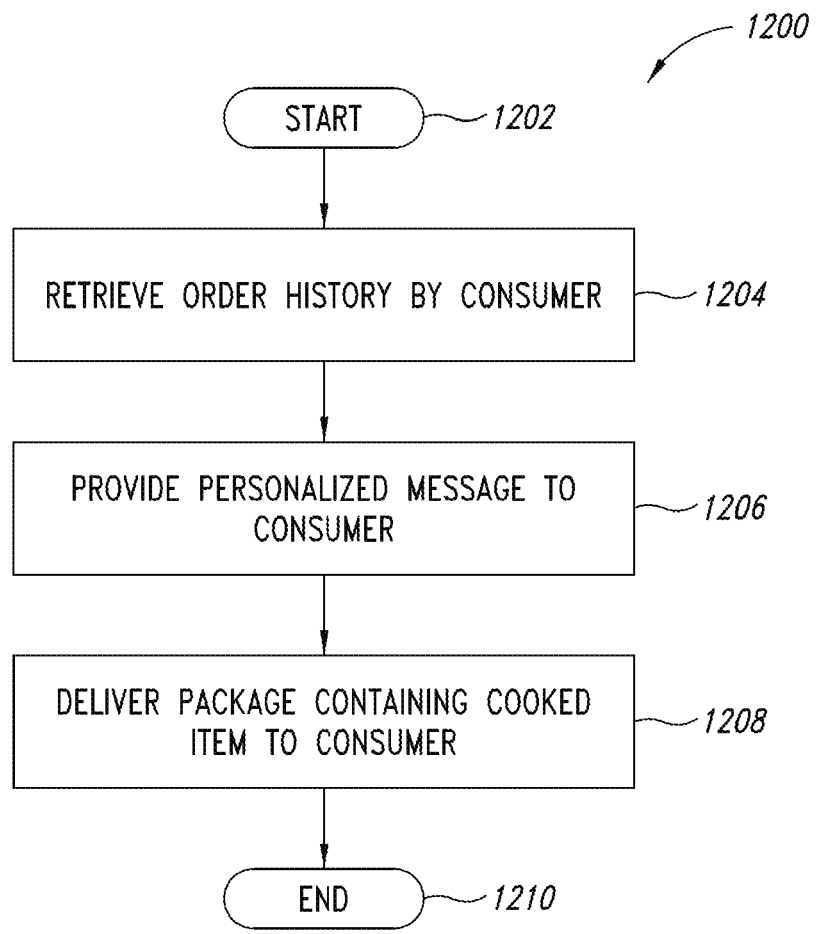
FIG. 12 is a logic flow diagram of an example preparation module in a food delivery system that includes retrieving an order history and providing a personalized message to the consumer upon delivery of the cooked food item, according to an illustrated embodiment.

FIG. 12 shows a high level logic flow diagram 1200 for an example food item delivery method using an enroute cooking system such as that described with respect to FIGS. 5-11. Personalized delivery experiences can serve as a market differentiator. In at least some instances, making such information available to the delivery driver prior to delivery of the food items 204 to the consumer can advantageously increase the perceived value of both the food items and the delivery thereof to the consumer. The method commences at 1002.

At 1204, information regarding a consumer, the consumer's past orders, other express or inferred consumer preferences, offers and promotions geared towards a consumer's express or inferred preferences may be communicated to the delivery driver prior to arrival at the consumer delivery destination 304. The information regarding a consumer, the consumer's past orders, other express or inferred consumer preferences, offers and promotions geared towards a consumer's express or inferred preferences can be stored in a nontransitory storage medium communicably coupled to the order input module 104 or the controller 102, for example the database 460. In at least some instances, such information may be provided at least in part via the display device 250.

At 1206, the delivery driver, using the consumer information provided by the display device 250, can provide a personalized message to the consumer when delivering the ordered food item(s) 204.

At 1208, the delivery driver can provide the freshly cooked food items, recently removed from the cooking unit 210, to the consumer. The method concludes at 1210.

Various embodiments of the devices and/or processes via the use of block diagrams, schematics, and examples have been set forth herein. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer readable medium for use by or in connection with any computer and/or processor related system or method. In the context of this document, a memory is a computer readable medium that is an electronic, magnetic, optical, or other another physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, and foreign patent applications referred to in this specification and/or listed in the Application Data Sheet, including but not limited to U.S. patent application Ser. No. 13/920,998, filed Jun. 18, 2013, International Patent Application PCT/US2014/042879, accorded an international filing date of Jun. 18, 2014, and U.S. patent application Ser. No. 15/040,866, filed Feb. 10, 2016 are incorporated herein by reference, in their entirety.

From the foregoing it will be appreciated that, although specific embodiments have been described herein for purposes of illustration, various modifications may be made without deviating from the spirit and scope of the teachings. Accordingly, the claims are not limited by the disclosed embodiments.

The invention claimed is:

1. A method of operation in a food preparation and delivery system, the method comprising:
   providing a vehicle having:

a plurality of independently operable ovens; and a controller that controls at least one of a temperature or a cooking time for each oven in the plurality of ovens;

cooking a food item in an oven from the plurality of ovens while the vehicle is traveling to a destination for delivery of the food item to a customer;

while cooking the food item:

dynamically updating an estimated time for the vehicle to arrive at the destination; and adjusting, using the at least one controller and based on the estimated time, at least one of the temperature or the cooking time for the oven from the plurality of ovens; and providing, for the customer, an image of at least one of producing or cooking the food item.

2. The method of claim 1, wherein providing the image comprises:

capturing the image of the producing of the food item; and providing the customer with a selectable link that provides access to the image.

3. The method of claim 1, wherein providing the image comprises:

capturing the image of the cooking of the food item; and providing the customer with a selectable link that provides access to the image.

4. The method of claim 1, wherein providing the image comprises:

capturing a first image of the producing of the food item;

capturing a second image of the cooking of the food item; and providing the customer with a selectable link that provides access to at least one of the first image or the second image.

5. The method of claim 1, further comprising loading the plurality of ovens in a rack.

6. The method of claim 5, further comprising loading the rack in the vehicle.

7. The method of claim 6, wherein the rack is loaded in the vehicle after the food item is loaded in the oven from the plurality of ovens.

8. The method of claim 1, further comprising:

producing the food item in a facility; and loading the food item in the oven from the plurality of ovens.

9. The method of claim 1, further comprising transferring the food item from the oven to packaging when the vehicle reaches the destination.

10. The method of claim 9, wherein transferring the food item from the oven to the packaging is performed using at least one transfer mechanism, without the food item being touched by a human during the transferring.

11. The method of claim 1, further comprising:

tracking a location of the vehicle; and providing, for the customer, a selectable link that provides access to information describing the tracked location of the vehicle.

12. The method of claim 1, further comprising:

tracking a location of the vehicle; and providing, for the customer, an indication of the estimated time to arrive at the destination.

13. The method of claim 1, further comprising:

detecting at least one operational condition of the oven in the vehicle;

wirelessly transmitting the detected at least one operational condition to a fixed site remote from vehicle; and wirelessly receiving updated cooking information from the fixed site.

14. The method of claim 1, further comprising, in response to the vehicle reaching the destination, presenting a visual identification via at least one light source to a delivery person of the oven that contains the food item.

15. The method of claim 1, wherein the food item is a solid food item.

16. The method of claim 1, further comprising biasing the food item in the oven against movement within the oven during transit of the vehicle.

17. The method of claim 1, wherein the plurality of ovens is disposed in a cargo compartment of the vehicle.

* * * * *